US010592274B2

(12) United States Patent
Sato et al.

(10) Patent No.: US 10,592,274 B2
(45) Date of Patent: Mar. 17, 2020

(54) COMPUTER SYSTEM AND ACCESS CONTROL METHOD

(71) Applicant: HITACHI, LTD., Tokyo (JP)

(72) Inventors: Katsuto Sato, Tokyo (JP); Tetsuro Honmura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 52 days.

(21) Appl. No.: 15/755,441

(22) PCT Filed: Oct. 26, 2015

(86) PCT No.: PCT/JP2015/080083
§ 371 (c)(1),
(2) Date: Feb. 26, 2018

(87) PCT Pub. No.: WO2017/072827
PCT Pub. Date: May 4, 2017

(65) Prior Publication Data
US 2018/0253331 A1 Sep. 6, 2018

(51) Int. Cl.
G06F 9/52 (2006.01)
G06F 9/46 (2006.01)
(Continued)

(52) U.S. Cl.
CPC ............. *G06F 9/468* (2013.01); *G06F 3/067* (2013.01); *G06F 3/0622* (2013.01);
(Continued)

(58) Field of Classification Search
None
See application file for complete search history.

(56) References Cited

U.S. PATENT DOCUMENTS 9,003,071 B2  4/2015 Liu
2008/0126581 A1* 5/2008 Komikado .............. G06F 3/061
710/5

(Continued)

FOREIGN PATENT DOCUMENTS

JP  2012-146280 A   8/2012
JP  2014-235501 A  12/2014
(Continued)

OTHER PUBLICATIONS

"NVM Express" Revision 1.1b Jul. 2, 2014.
(Continued)

*Primary Examiner* — Brian R Peugh
(74) *Attorney, Agent, or Firm* — Volpe and Koenig, P.C.

(57) ABSTRACT

This computer system includes: at least one computer having a memory and a plurality of CPU cores; and a storage sub device having a plurality of logical storage units configured using storage devices. In the computer, a plurality of queues are configured in the memory, and at least one of the plurality of CPU cores is assigned to each of the plurality of queues. The queue is enqueued with an I/O command dispatched from a CPU core, to which the queue is assigned, to a logical storage unit. The computer system has access control information including information concerning whether to accept or refuse access from each queue to each logical storage unit.

12 Claims, 23 Drawing Sheets

(51) Int. Cl.
*G06F 13/16* (2006.01)
*G06F 3/06* (2006.01)
*G06F 9/455* (2018.01)
*G06F 9/54* (2006.01)

(52) U.S. Cl.
CPC .......... *G06F 3/0626* (2013.01); *G06F 3/0659* (2013.01); *G06F 9/45558* (2013.01); *G06F 9/546* (2013.01); *G06F 13/16* (2013.01); *G06F 9/52* (2013.01); *G06F 2009/45579* (2013.01); *G06F 2009/45583* (2013.01)

(56) References Cited

U.S. PATENT DOCUMENTS

| | | | |
|---|---|---|---|
| 2010/0077106 A1* | 3/2010 | Komikado | G06F 3/061 710/5 |
| 2012/0179799 A1 | 7/2012 | Kano et al. | |
| 2014/0109100 A1 | 7/2014 | Nozue | |
| 2014/0359267 A1 | 12/2014 | Moriki et al. | |

FOREIGN PATENT DOCUMENTS

| | | |
|---|---|---|
| WO | 2013/001613 A1 | 1/2013 |
| WO | 2015/079528 A1 | 6/2015 |

OTHER PUBLICATIONS

Intel Virtualization Technology for Directed I/O, Architecture Specification, Oct. 2014, Rev2.3.
AMD I/OVirtualization Technology (IOMMU) Specification, Rev2. 62, Feb. 2015, Pub#48882.
http://www.synopsys.com/Japan/today-tomorrow/Pages/tt82_pci_express_part2.aspx in Japanese Language.
International Search Report for WO 2017/072827 A1, dated Jan. 19, 2016.

* cited by examiner

Access violation log 430

| Queue group ID 1001 | Read violation 1002 | Write violation 1003 |
|---|---|---|
| 1 | 0 | 0 |
| 3 | 40 | 5 |
| 4 | 0 | 0 |
| 10 | 0 | 0 |

Fig. 10

| Queue assignment manager | | | | | |
|---|---|---|---|---|---|
| Server ID 1011 | Max queues 1012 | Queue group ID 1013 | Assigned queue ID 1014 | Accessible LU ID 1015 | Operation 1016 |
| 1 | 32 | 1 | 0,1,2,3,4,5,6,7 | 1,2,3 | Remove / Modify |
| 2 | 64 | 3 | Not assigned | 4,5,6 | Remove / Modify |
| 3 | 96 | 0 | 10,12,14,16 | 7,8 | Remove / Modify |
| 4 | 16 | 2 | 32,33,34,35,36,37 | 1,2,3,10 | Remove / Modify |
| 10 | 16 | 4 | 43,44,45,46 | 4,7,10,11 | Remove / Modify |

Fig. 12

# COMPUTER SYSTEM AND ACCESS CONTROL METHOD

TECHNICAL FIELD

The present invention generally relates to a technique for a computer system and particularly relates to a technique for access control.

BACKGROUND ART

Flash memory-based storage devices such as Solid State Drives (SSDs) have significantly higher I/O performances than Hard Disk Drives (HDDs). Non-volatile Memory Express (NVMe) is known as an I/F standard for coupling such storage devices with relatively high I/O performances (NPL 1). NVMe enables queues (a Submission Queue and a Completion Queue) for processing a command to be provided in plurality between a device driver that is a command dispatch source and a storage device. Accordingly, NVMe improves communication speed between the device driver that is a command dispatch source and the storage device.

PTL 1 discloses a method of causing an NVMe-compliant storage device to perform an access control process using a physical function existing on a PCI Express (PCIe) bus and a virtual function generated based on Single Root Input Output Virtualization (SR-IOV).

CITATION LIST

Patent Literature

[PTL 1]
U.S. Pat. No. 9,003,071

Non Patent Literature

[NPL1]
"NVM Express" Revision 1.1b, Jul. 2, 2014
[NPL2]
Intel Virtualization Technology for Directed I/O, Architecture Specification, October 2014, Rev 2.3
[NPL3]
AMD I/O Virtualization Technology (IOMMU) Specification, Rev 2.62, February 2015, Pub #48882
[NPL4]
http://www.synopsys.com/Japan/today-tomorrow/Pages/tt82_pci_express_part2.aspx

SUMMARY OF INVENTION

Technical Problem

With the technique disclosed in PTL 1 which is premised on SR-IOV, restrictions on a computer attributable to SR-IOV also arise in an access control function. In this case, a computer includes both a physical computer and a virtual computer unless otherwise noted. Examples of the restrictions include one or more of the following restrictions.

(Restriction 1) The number of functions specifiable in PCIe is small. PCIe Gen2 provides only 3 bits' worth of routing ID fields of a Transaction Layer Packet (TLP) header, and PCIe Gen3 provides only 8 bits' worth of routing ID fields of a Transaction Layer Packet (TLP) header even when using Alternative Routing ID Interpretation (ARI). Therefore, more than 256 functions cannot be provided unless a storage device has a plurality of end points. As a result, with the technique according to PTL 1, it is difficult to configure independent access control exceeding a maximum number of functions specified in the PCIe standard and, even when independent access control can be configured, a single device must be provided with a plurality of end points.

(Restriction 2) A virtual function can be realized with fewer hardware resources than a physical function. NPL 4 discloses that a gate mounting cost for a virtual function is $1/10$ of that for a physical function. Nevertheless, a device must be equipped with a large amount of hardware resources in order to generate a large amount of virtual functions.

(Restriction 3) A computer requires an SR-IOV-compatible Basic Input/Output System (BIOS), an Extensible Firmware Interface (EFI), or an NVMe device driver.

An object of the present invention is to provide an NVMe storage with access control having fewer restrictions attributable to SR-IOV. Other objects of the present invention will become apparent in the description of embodiments.

Solution to Problem

A computer system according to an embodiment includes: at least one computer having a memory and a plurality of CPU cores; and a storage sub device having a plurality of logical storage units constituted by a storage device. In the computer, a plurality of queues are configured in the memory, and at least one of the plurality of CPU cores is assigned to each of the plurality of queues. A queue is enqueued with an I/O command dispatched from a CPU core, to which the queue is assigned, to a logical storage unit. The computer system includes access control information including information regarding whether to accept or refuse access from each queue to each logical storage unit.

Advantageous Effects of Invention

According to the present invention, an NVMe storage with access control having fewer restrictions attributable to SR-IOV can be provided.

BRIEF DESCRIPTION OF DRAWINGS

FIG. 10 shows a configuration example of an access violation log.

FIG. 12 shows an example of a queue assignment management screen.

DESCRIPTION OF EMBODIMENTS

Figure 1:
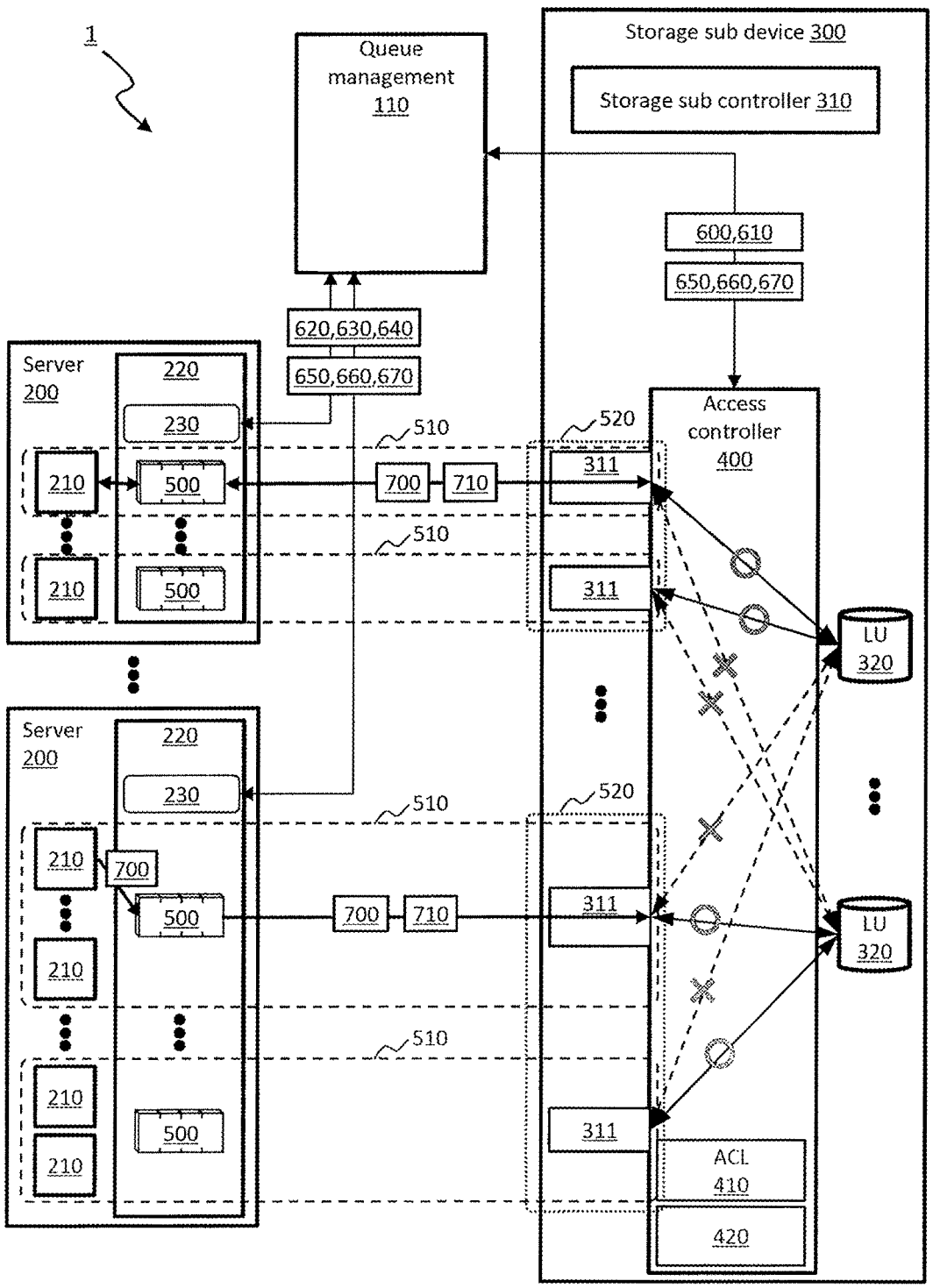
FIG. 1 shows an example of a logical configuration of a computer system.

Hereinafter, several embodiments will be described. While information according to the present invention will be described below using expressions such as an "aaa table", an "aaa list", and an "aaa queue", these pieces of information may be expressed without using data structures such as a table, a list, and a queue. Therefore, in order to demonstrate that information is not dependent on data structure, an "aaa table", an "aaa list", an "aaa queue", and the like may sometimes be referred to as "aaa information". Furthermore, while the expressions "identification information", "identifier", "name", "surname", and "ID" may be used when describing contents of the respective pieces of information, these expressions are interchangeable.

While a "program" is sometimes used as a subject in the following description, since a program causes prescribed processing to be performed using a memory and a communication port (a communication control device) by being executed by a processor, a "processor" may instead be used as a subject in the following description. In addition, processing disclosed using a program as a subject may be considered processing performed by a computer or an information processing apparatus such as a management server. Furthermore, a program may be partially or entirely realized by dedicated hardware.

In addition, various programs may be installed in various computers from a program distribution server or via computer-readable storage media. In this case, the program distribution server includes a CPU and a storage resource, and the storage resource further stores a distribution program and a program that is a distribution target. Furthermore, by executing the distribution program, the CPU of the program distribution server distributes the program that is the distribution target to other computers.

Moreover, a management computer includes an input/output device. While conceivable examples of an input/output device include a display, a keyboard, and a pointer device, other devices may be used. Furthermore, by adopting a serial interface or an Ethernet interface as an alternative to an input/output device, coupling a display computer including a display, a keyboard, or a pointer device to the interface, and transmitting display information to the display computer or receiving input information from the display computer, input and display using an input/output device may be substituted by displaying on the display computer and accepting input from the display computer.

Hereinafter, a set of one or more computers which manage an information processing system and which display information according to the present invention may be referred to as a management system. When a management computer displays display information, the management computer constitutes a management system. A combination of a management computer and a display computer also constitutes a management system. Furthermore, processes identical or similar to those of a management computer may be realized by a plurality of computers in order to increase speed or reliability of a management process. In this case, the plurality of computers (when a display computer performs display, including the display computer) constitute a management system.

FIG. 1 shows an example of a logical configuration of a computer system 1.

The computer system 1 includes one or more server apparatuses 200 and a storage sub device 300.

The storage sub device 300 includes a storage medium, a storage sub controller 310, and an access controller 400. The storage medium is constituted by a data readable/writable non-volatile storage medium and is, for example, a flash memory chip. The storage sub controller 310 controls the entire storage sub device 300 and realizes respective functions included in the storage sub device 300. The storage sub controller 310 may manage a storage area of the storage medium by dividing the storage area into one or more logical units (hereinafter, referred to as "LUs") 320. An ID may be assigned to each LU 320.

The access controller 400 manages and controls access rights to each LU 320. When the storage sub device 300 is NVMe-compliant, a NameSpace (NS) may be used to specify the LU 320 that is an access destination. The access controller 400 may be a program executed by the storage sub controller 310 or a dedicated circuit mounted to the storage sub device 300. Details of functions of the access controller 400 will be provided later.

The server apparatus 200 includes one or more CPU cores 210 and a memory 220. An I/O queue 500 accessible from the storage sub controller 310 may be constructed on the memory 220. In addition, a device driver 230 that is a type of program may be stored in the memory 220. The device driver 230 may be executed by the CPU core 210 to create and delete the I/O queue 500 and the like.

The computer system 1 includes a queue management mechanism 110. The queue management mechanism 110 manages a plurality of I/O queues 500 assigned to each server apparatus 200 as a queue group. Details of functions of the queue management mechanism 110 will be provided later. The queue management mechanism 110 may be a program executed by any of the server apparatuses 200 or a dedicated circuit mounted to any of the server apparatuses 200. Alternatively, the queue management mechanism 110 may be a program executed by a prescribed management computer capable of bidirectionally communicating with each server apparatus 200 and the storage sub device 300 or a dedicated circuit mounted to the management computer. Alternatively, the queue management mechanism 110 may be a program executed by a switching apparatus existing on a network connecting the server apparatuses 200 and the storage sub device 300 or a dedicated circuit mounted to the switching apparatus.

The CPU core 210 of the server apparatus 200 is capable of requesting an I/O to the storage sub device 300 by enqueuing an I/O request 700 that is a type of an I/O command to the I/O queue 500 statically (fixedly) assigned to the CPU core 210. A CPU core 210 to which the I/O queue 500 is not assigned cannot request an I/O to the storage sub device 300. In this case, "statically" means that an assignment relationship between the CPU core 210 and the I/O queue 500 is not dynamically changed midway.

The storage sub device 300 has a plurality of queue resources 311 respectively corresponding to the plurality of I/O queues 500. A queue ID may be assigned to each set made up of an I/O queue 500 and a queue resource 311 corresponding to the I/O queue 500.

The storage sub device 300 can dequeue the I/O request 700 enqueued to the I/O queue 500 to the queue resource 311 corresponding to the I/O queue 500 to specify a queue ID assigned to the I/O queue 500.

The access controller 400 may control an access right to each LU ID in units of queue IDs 510 using an ACL 410 including a configuration of an access right (for example, a configuration regarding whether to accept or refuse access) of each queue ID with respect to each LU ID. Alternatively, the access controller 400 may control an access right to each LU ID in units of queue group IDs using a queue group 420 including information on queue IDs belonging to each queue group ID and the ACL 410 described above.

The queue management mechanism 110 and the device driver 230 of the server apparatus 200 transmit and receive management commands 620, 630, and 640 related to queue assignment. In addition, the queue management mechanism 110 and the device driver 230 transmit and receive management commands 650, 660, and 670 related to queue generation. Details of the management commands 620, 630, 640, 650, 660, and 670 will be provided later. The queue management mechanism 110 and the access controller 400 of the storage sub device 300 transmit and receive management commands 600 and 610 related to operations of a queue group. Details of the management commands 600 and 610 will be provided later.

Next, an example of processing for determining the number of queues to be assigned to the server apparatus 200 will be described (steps S11 to S13).

(S11) The device driver 230 of the server apparatus 200 transmits a queue assignment request 620 (refer to FIG. 3) to the queue management mechanism 110. The queue assignment request 620 may include the number of queues requested by the server apparatus 200. The number of requested queues may be the number of CPU cores 210 mounted to the server apparatus 200.

(S12) The queue management mechanism 110 receives the queue assignment request 620 and determines the number of queues to be assigned to the server apparatus 200 that is a dispatch source of the queue assignment request 620. The queue management mechanism 110 may manage the number of available queues of the storage sub device 300 and, when the number of available queues is equal to or larger than the number of requested queues, the queue management mechanism 110 may determine to assign the number of requested queues to the server apparatus 200. When the number of available queues is smaller than the number of requested queues, the queue management mechanism 110 may determine to assign the number of available queues to the server apparatus 200. In addition, the queue management mechanism 110 transmits a queue assignment result 630 (refer to FIG. 3) including the determined number of assigned queues and IDs of the assigned queues to the device driver 230.

(S13) When the device driver 230 receives the queue assignment result 630, the device driver 230 respectively assigns queues corresponding to the queue IDs included in the queue assignment result 630 to the CPU cores 210. When the number of assigned queues is equal to or larger than the number of CPU cores 210 included in the server apparatus 200, the device driver 230 may assign one queue ID to one CPU core 210. When the number of assigned queues is smaller than the number of CPU cores 210 included in the server apparatus 200, the device driver 230 may assign one queue ID to two or more CPU cores 210. In this case, the two or more CPU cores 210 are to share the one queue ID.

According to the processing described above, the number of queues to be assigned to each server apparatus 200 is determined.

Next, an example of processing for creating a set of a queue between the server apparatus 200 and the storage sub device 300 will be described (steps S21 to S25). The server apparatus 200 creates queues by the number of queues assigned to the server apparatus 200 itself by steps S11 to S13 described above. The following represents processing for creating one of such queues.

(S21) The device driver 230 selects one of the queue IDs included in the queue assignment result 630 received in step S13 described above. In addition, the device driver 230 transmits a queue create request 650 (refer to FIG. 4) including the selected queue ID to the queue management mechanism 110.

(S22) The queue management mechanism 110 receives the queue create request 650 and transfers the queue create request 650 to the storage sub device 300.

(S23) The storage sub device 300 receives the queue create request 650 and creates a set of the I/O queue 500 corresponding to the queue ID 651 included in the queue create request 650 and a queue resource 311. In addition, the storage sub device 300 transmits a queue create response 660 (refer to FIG. 4) to the queue management mechanism 110.

(S24) The queue management mechanism 110 receives the queue create response 660 and transfers the queue create response 660 to the device driver 230.

(S25) The device driver 230 receives the queue create response 660.

According to the processing described above, a set of a queue is created between the server apparatus 200 and the storage sub device 300.

Next, an example of processing for newly causing a queue to belong to a queue group will be described (steps S31 and S32).

(S31) The queue management mechanism 110 transmits a queue group operation command 600 (refer to FIG. 2) which is a type of a management command to the storage sub device 300. The queue group operation command 600 may include a queue group ID 601, an operation type 602 indicating "add" of a queue, and one or more queue IDs 604 to be caused to belong to the queue group ID 601.

(S32) The access controller 400 having received the queue group operation command 600 modifies a queue group table 420 so that the queue ID 604 belongs to the queue group ID 601.

According to the processing described above, an affiliation between a queue group ID and a queue ID is reflected onto the queue group table 420.

Next, an example of processing for changing an access right to the LU 320 will be described.

(S41) The queue management mechanism 110 transmits an access right operation command 610 (refer to FIG. 2) which is a type of a management command to the storage sub device 300. The access right operation command 610 may include a queue group ID 611 that is a change target, an operation type 612 indicating an access right after change (for example, whether to "accept" or "refuse" access), and one or more LU IDs 614 that are change targets.

(S42) The access controller 400 having received the access right operation command 610 operates the ACL 410 and changes the access right to the LU ID 614 that is a change target from each queue ID belonging to the queue group ID 611 that is a change target to the access right after change.

According to the processing described above, an access right for a queue group can be configured and changed.

Figure 2:
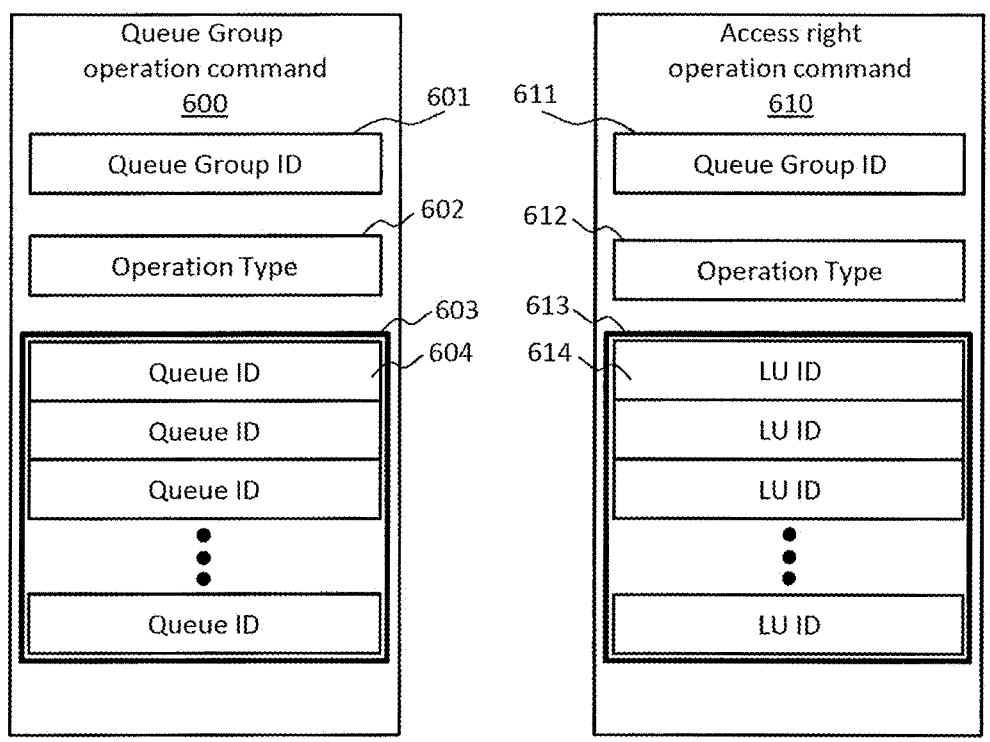
FIG. 2 shows configuration examples of a queue group operation command and an access right operation command.

FIG. 2 shows configuration examples of the queue group operation command 600 and the access right operation command 610.

The queue group operation command 600 is a management command used by the queue management mechanism 110 to operate a queue group. The queue group operation command 600 may include, as item values (field values), a queue group ID 601, an operation type 602, and a queue ID list 603 including one or more queue IDs 604. The queue group ID 601 is an ID of a queue group that is an operation target.

The operation type 602 is information indicating how the queue group with the ID 601 is to be operated. An operation type 602 "add" may indicate an operation for adding a queue ID 604 included in the queue ID list 603 to the queue group ID 601. An operation type 602 "delete" may indicate an operation for deleting a queue ID 604 included in the queue ID list 603 from the queue group ID 601.

The access right operation command 610 is a management command used by the queue management mechanism 110 to operate an access right from a queue group to each LU 320. The access right operation command 610 may include, as item values (field values), a queue group ID 611, an operation type 612, and an LU ID list 613 including one or more LU IDs 614. The queue group ID 611 is an ID of a queue group that is an operation target of the access right operation command 610.

The operation type 612 is information indicating what kind of access right is to be configured for the queue group with the ID 611. An operation type 612 "accept" may indicate an operation for configuring access from a queue ID belonging to the queue group ID 611 to an LU ID 614 included in the LU ID list 613 to be accepted. An operation type 612 "refuse" may indicate an operation for configuring access from a queue ID belonging to the queue group ID 611 to an LU ID 614 included in the LU ID list 613 to be refused.

Figure 3:
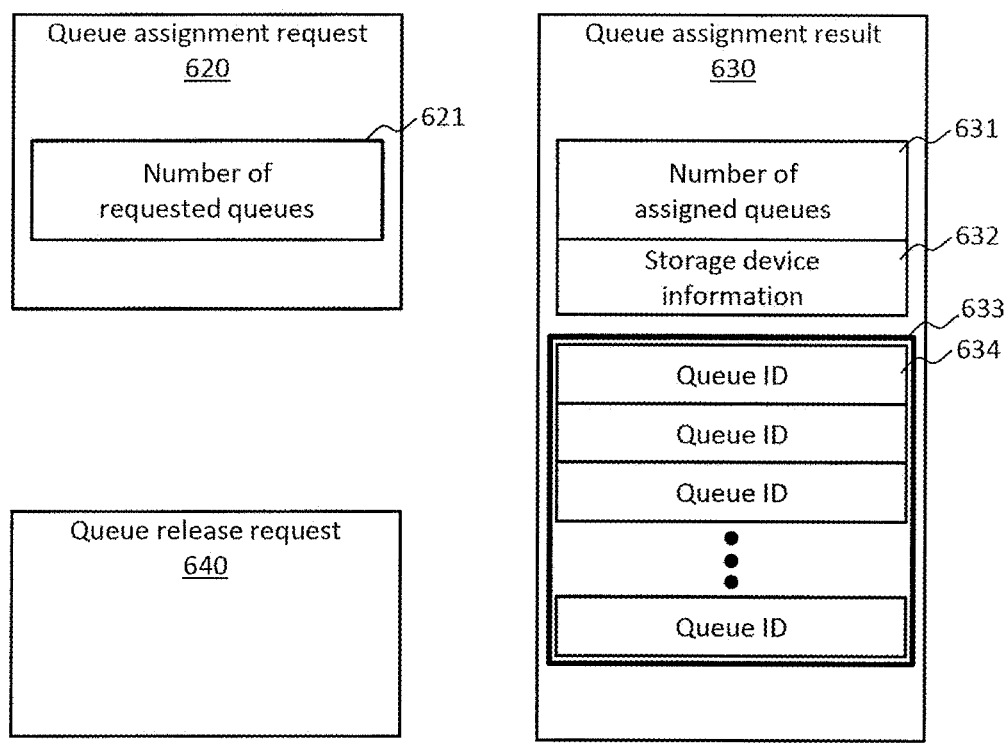
FIG. 3 shows an example of configurations of a queue assignment request, a queue assignment result, and a queue release request.

FIG. 3 shows an example of configurations of the queue assignment request 620, the queue assignment result 630, and the queue release request 640.

The queue assignment request 620 is a management command used by the device driver 230 to request assignment of a queue to the queue management mechanism 110. The queue assignment request 620 may include, as an item value (a field value), the number of requested queues 621.

The number of requested queues 621 represents the number of queues requested by the device driver 230 (the server apparatus 200). Typically, the number of requested queues 621 may be equal to or larger than the number of CPU cores 210 mounted to the server apparatus 200 that includes the device driver 230. This is to avoid competing with one another for one I/O queue 500 of the plurality of CPU cores 210. However, the number of requested queues 621 may be smaller than the number of CPU cores 210 mounted to the server apparatus 200. In this case, the plurality of CPU cores 210 may share one I/O queue 500.

The queue assignment result 630 is a management command used by the queue management mechanism 110 to respond to the device driver 230 with an execution result of the queue assignment request 620. The queue assignment result 630 may include, as item values (field values), the number of assigned queues 631, storage sub device information 632, and a queue ID list 633.

The number of assigned queues 631 represents the number of queues to be assigned to the device driver 230. When the number of available (unassigned) queues is equal to or larger than the number of requested queues 621, the queue management mechanism 110 may set the number of assigned queues 631 to be the same as the number of requested queues 621. When the number of available queues is smaller than the number of requested queues 621, the queue management mechanism 110 may set the number of assigned queues 631 to be smaller than the number of requested queues 621 (for example, the number of available queues).

The storage sub device information 632 is information necessary for accessing the storage sub device 300. An example of the storage sub device information 632 is an IP address of the storage sub device 300. A queue ID 634 included in the queue ID list 633 is an ID of a queue to be assigned to the device driver 230.

The queue release request 640 is a management command used by the device driver 230 to request release of a queue being assigned to the server apparatus 200 of the device driver 230 to the queue management mechanism 110.

Figure 4:
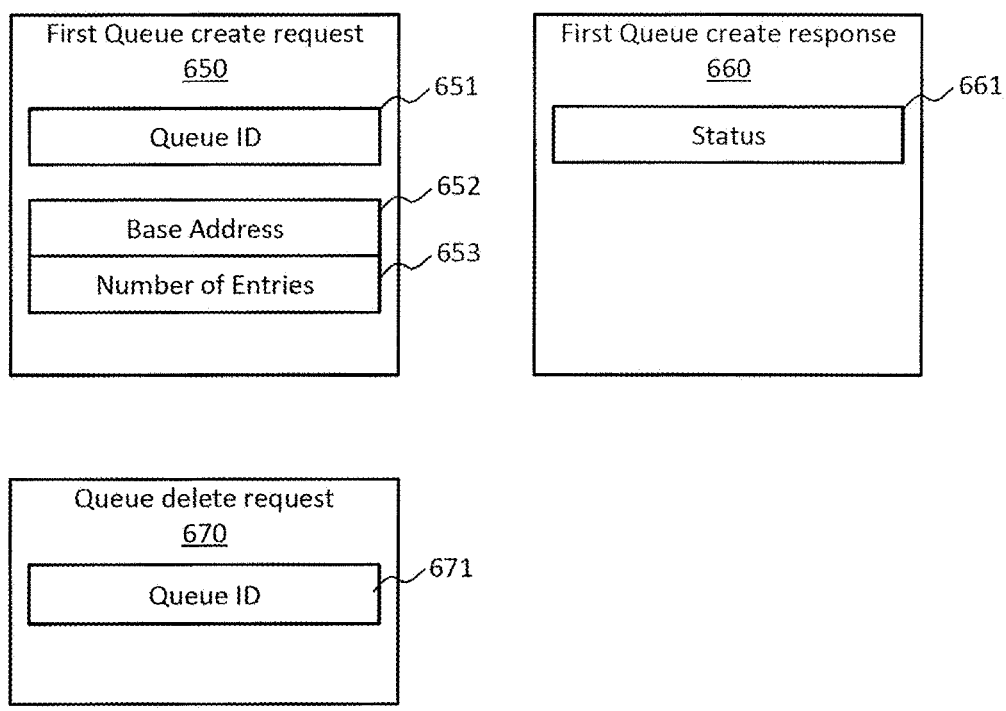
FIG. 4 shows configuration examples of a first queue create request, a first queue create response, and a queue delete request.

FIG. 4 shows configuration examples of a first queue create request 650, a first queue create response 660, and a queue delete request 670.

The first queue create request 650 is a management command used by the queue management mechanism 110 to request creation of a queue to the storage sub device 300. When the queue management mechanism 110 receives a second queue create request 680 such as that shown in FIG. 11 from the device driver 230, the queue management mechanism 110 may generate the first queue create request 650 based on the second queue create request 680 and transmit the first queue create request 650 to the storage sub device 300.

The first queue create request 650 may include, as item values (field values), a queue ID 651, a base address 652, and the number of entries 653. The queue ID 651 is an ID of a queue that is requested to be created. The base address 652 is an address where a queue with the ID 651 is to be created in the memory 220 of the server apparatus 200. The number of entries 653 represents the number of entries that can be made in a queue with the ID 651.

The device driver 230 that sends the first queue create request 650 may reserve a memory area of a size calculated based on the number of entries 653 on the memory 220 at the base address 652 of the memory 220 included in the request 650 and may create an I/O queue 500 corresponding to the queue ID 651.

The storage controller 310 having received contents of the first queue create request 650 may create a queue resource 311 corresponding to the queue ID 651 included in the request 650.

The first queue create response 660 is a management command used by the device driver 230 to respond to the queue management mechanism 110 with an execution result of the first queue create request 650. The storage controller 310 may generate the first queue create response 660 including the execution result of the first queue create request 650 and transmit the first queue create response 660 to the queue management mechanism 110. The queue management mechanism 110 having received the first queue create response 660 may generate a second queue create response 690 such as that shown in FIG. 11 based on the first queue create response 660 and transmit the second queue create response 690 to the device driver 230.

The first queue create response 660 may include, as an item value (a field value), a status 661. The status 661 is information indicating an execution result of the queue create request 650. Examples of the status 661 include queue creation "success", "failure", and the like.

The queue delete request 670 is a management command used by the device driver 230 to request deletion of a queue to the queue management mechanism 110. The queue management mechanism 110 having received the queue delete request 670 may either transfer the queue delete request 670 to the storage sub device 300 without modification or transfer the queue delete request 670 after conversion into a prescribed system.

The queue delete request may include, as an item value (a field value), a queue ID 671. The queue ID 671 is an ID of a queue that is requested to be deleted.

The storage controller 310 having received the queue delete request 670 deletes the queue resource 311 corresponding to the queue ID 671 included in the request 670. In addition, the device driver 230 deletes the I/O queue 500 corresponding to the queue ID 671 and releases a memory area on the main memory 220.

Figure 5:
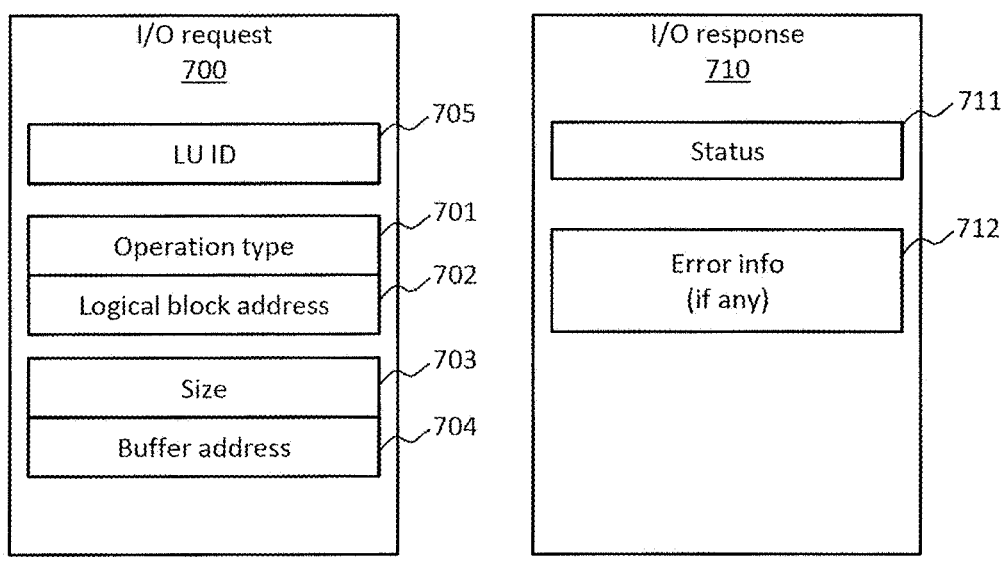
FIG. 5 shows an example of configurations of an I/O request and an I/O response.

FIG. 5 shows configuration examples of the I/O request 700 and an I/O response 710.

The I/O request 700 is an I/O command used by the CPU core 210 of the server apparatus 200 to request write/read of data and the like to the LU 320 of the storage sub device 300. The CPU core 210 is capable of transmitting the I/O request 700 to the storage sub device 300 by enqueuing the I/O request 700 to the I/O queue 500 corresponding to the queue ID statically assigned to the CPU core 210 itself. The I/O request 700 may include, as item values (field values), an LU ID 705, an operation type 701, a logical block address 702, a size 703, and a buffer address 704.

The LU ID 705 represents an ID of the LU 320 that is an access destination.

The operation type 701 is information indicating what kind of an I/O operation is to be performed on the LU 320 with the ID 705. Examples of the operation type 701 include "write", "read", and "delete".

The logical block address 702 is an address of a logical block of an access destination in the LU 320 with the ID 705.

When the operation type 701 is "write", the size 703 represents a size of write data. When the operation type 701 is "read", the size 703 represents a size of read data.

When the operation type 701 is "write", the buffer address 704 represents an address of the memory 220 storing write data. When the operation type 701 is "read", the buffer address 704 represents an address of the memory 220 to store read data.

The I/O response 710 is an I/O command used by the storage sub controller 310 to respond to the CPU core 210 of the server apparatus 200 with an execution result of the I/O request 700. The storage sub controller 310 is capable of transmitting the I/O response 710 to the CPU core 210 that is a transmission destination by enqueuing the I/O response 710 to the I/O queue 500 corresponding to the queue ID statically assigned to the CPU core 210. The I/O response 710 may include, as item values (field values), a status 711 and error information 712 (if any).

The status 711 is information indicating an execution result of the I/O request 700. Examples of the status 711 include I/O "success", "failure", and the like.

When the status 711 is "failure", the error information 712 is information indicating a reason for the failure.

The commands described above may directly include item values in a data structure of the commands. Alternatively, the item values described above may be stored in a prescribed storage area accessible from the server apparatus 200, the queue management mechanism 110, and the storage sub device 300, in which case the commands may only include an address (a pointer) to the storage area. The commands may further include information necessary for the storage sub device 300 to operate such as an ID for associating a request and a response with each other.

First Embodiment

Figure 6:
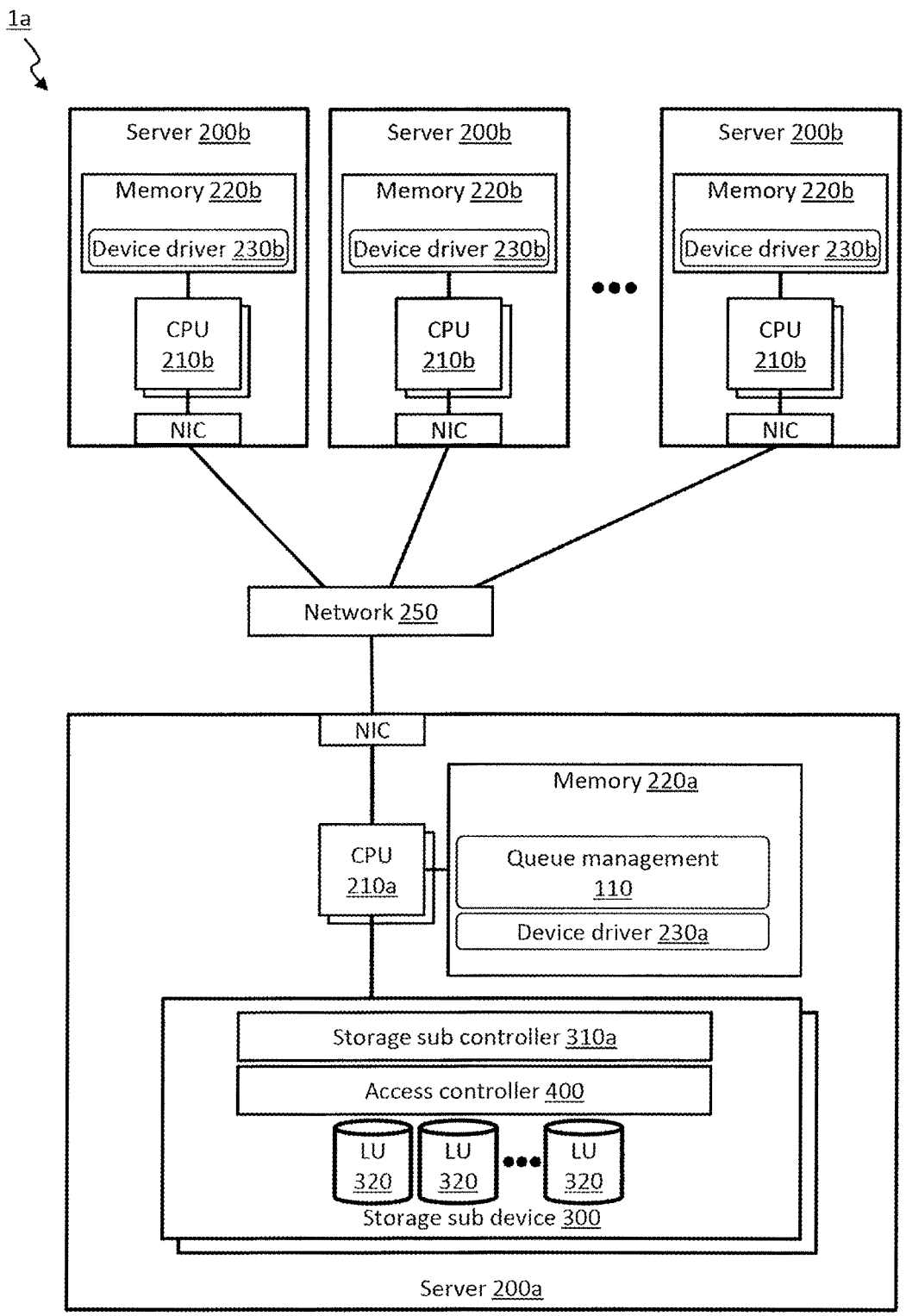
FIG. 6 shows an example of a hardware configuration of a computer system according to a first embodiment.
Figure 7:
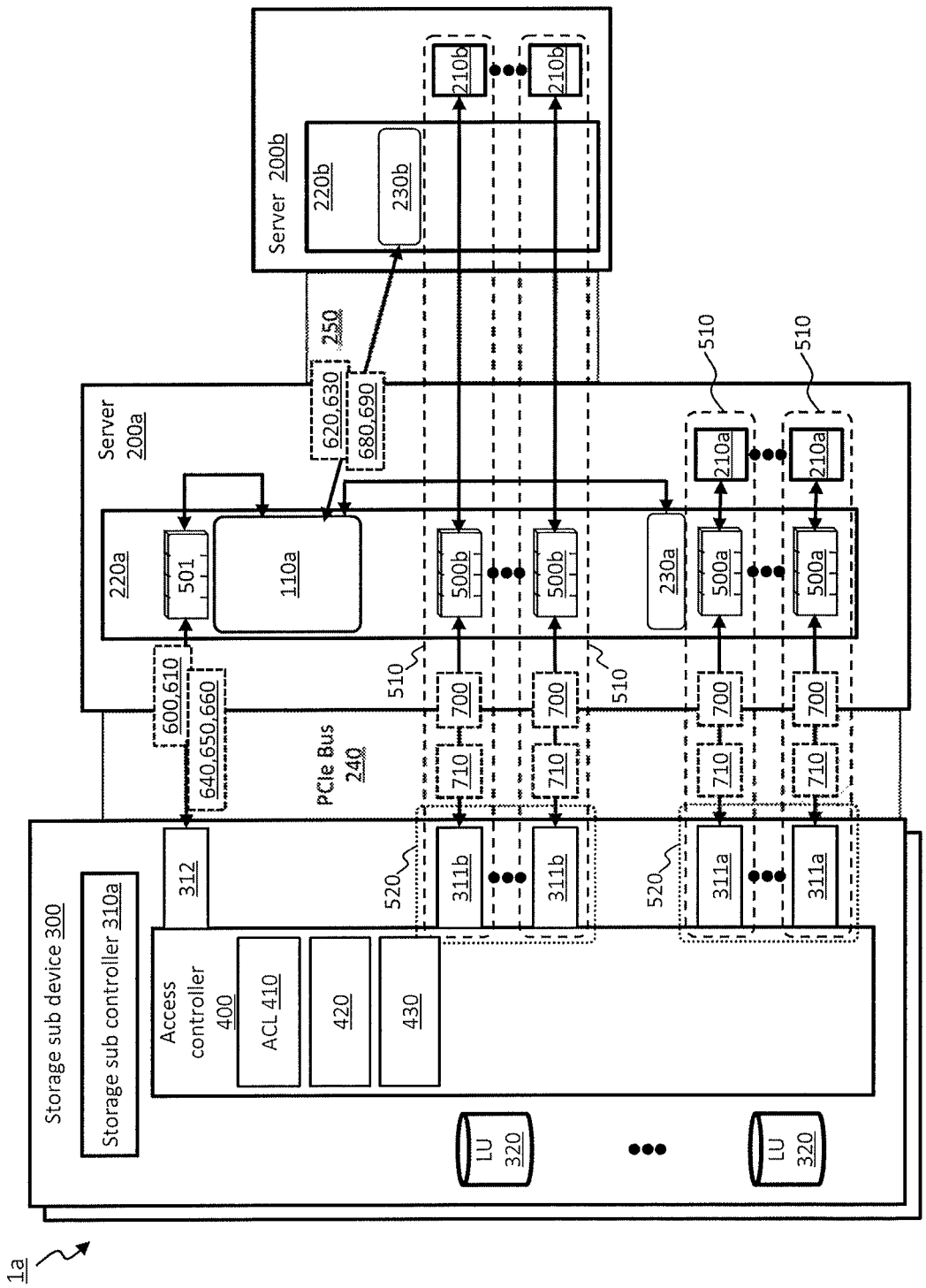
FIG. 7 shows an example of a logical configuration of a computer system according to the first embodiment.

FIG. 6 shows a hardware configuration example of a computer system 1a according to a first embodiment. FIG. 7 shows a logical configuration example of the computer system 1a according to the first embodiment.

The computer system 1a includes a first server apparatus 200a and one or more second server apparatuses 200b. The first server apparatus 200a may include a CPU core 210a, a memory 220a, an NIC, and a storage sub device 300. These elements may be coupled via, for example, a PCIe bus 240 so as to be capable of bidirectional communication. The second server apparatus 200b may include a CPU core 210b, a memory 220b, and an NIC. These elements may be coupled via, for example, a PCIe bus so as to be capable of bidirectional communication. The first server apparatus 200a and the second server apparatus 200b may be coupled to each other via a network 250 so as to be capable of bidirectional communication. Examples of the network 250 include the Ethernet (registered trademark), InfiniBand, and Fibre Channel.

The memory 220a of the first server apparatus 200a may store a program for realizing a queue management mechanism 110a and a program for realizing a device driver 230a. The memory 220a may be provided with an I/O queue 500a for storing I/O commands 700 and 710 to be exchanged between a CPU core 210a of the first server apparatus 200a and the storage sub device 300. The memory 220a may be provided with an I/O queue 500b for storing the I/O commands 700 and 710 to be exchanged between a CPU core 210b of the second server apparatus 200b and the storage sub device 300. In this case, the CPU core 210b of the second server apparatus 200b may transmit I/O commands to the I/O queue 500b in the memory 220a of the first server apparatus 200a by Remote Direct Memory Access (RDMA).

The memory 220a may be provided with a management queue 501 for storing management commands 600, 610, 640, 650, and 660 to be exchanged between the queue management mechanism 110a and the storage sub device 300.

The memory 220a may store the device driver 230a which associates the CPU core 210a related to the first server apparatus 200a with the I/O queue 500a. In this case, since the device driver 230a and the queue management mechanism 110a exist in the same first server apparatus 200a, management commands may be transmitted and received by local loop back.

The memory 220b of the second server apparatus 200b may store a device driver 230b which associates the CPU core 210b related to the second server apparatus 200b with the I/O queue 500b. In this case, the device driver 230b and the queue management mechanism 110a may transmit and receive management commands via the network 250.

The storage sub device 300 includes a storage medium, a storage sub controller 310a, and the access controller 400. Functions of these elements are as described earlier. The access controller 400 manages the ACL 410, the queue group table 420, and the access violation log 430.

Figure 8:
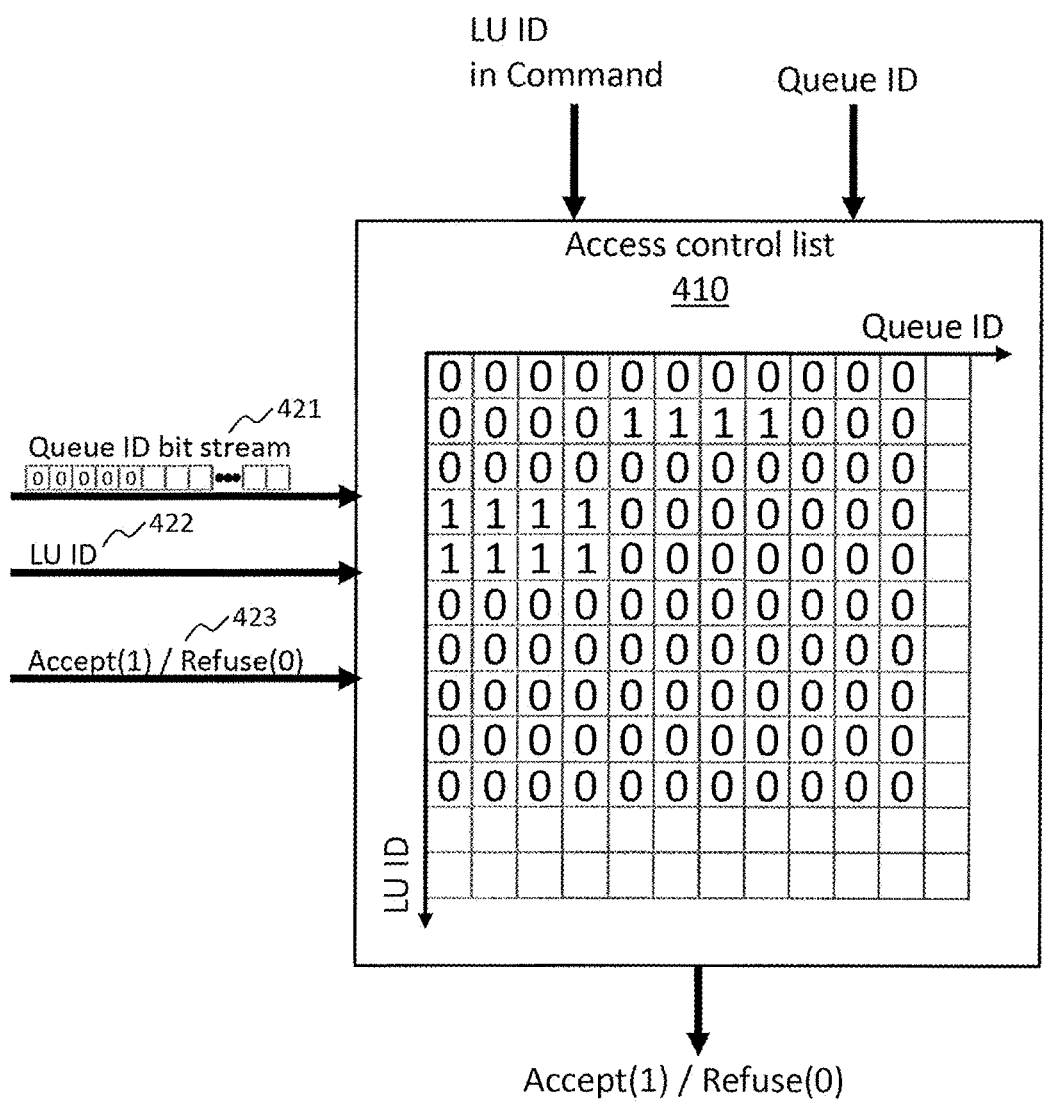
FIG. 8 shows an example of a configuration of an ACL.

FIG. 8 represents a configuration example of the ACL 410.

The ACL 410 is configuration information of an access right (whether to accept or refuse access) of each queue ID with respect to each LU ID. As shown in FIG. 8, the ACL 410 may be a two-dimensional bitmap constituted by a plurality of queue IDs and a plurality of LU IDs.

The access controller 400 may determine whether to accept or refuse access by a queue ID with respect to an LU ID by processes (A1) to (A3) described below.

(A1) The access controller 400 specifies an ID of a queue having dequeued the I/O request 700 and the LU ID 705 in the I/O request 700.

(A2) The access controller 400 acquires a bit (referred to as an "access control bit") specified by the specified LU ID and queue ID from the ACL 410.

(A3) When the acquired access control bit is "0", the access controller 400 may determine to "refuse" access by an I/O request dequeued from a queue with the queue ID specified in (A1) described above to the LU 320 with the LU ID specified in (A1) described above. When the acquired access control bit is "1", the access controller 400 may determine to "accept" access by an I/O request dequeued from a queue with the queue ID specified in (A1) described above to the LU 320 with the LU ID specified in (A1) described above.

According to the processing described above, the access controller 400 can determine whether to accept or refuse access by the I/O request 700 to the LU 320. Moreover, in opposite to the above, the access control bit "1" may be associated with "refuse" and the access control bit "0" may be associated with "accept". Alternatively, the access control bit may be configured with multiple values so as to have meanings other than "refuse" and "accept". A size of the ACL 410 (bitmap) may be determined based on a product of a maximum number of queues and a maximum number of LUs allowable by the storage sub device 300.

The access controller 400 may change the ACL 410 by processes (B1) to (B4) described below.

(B1) The access controller 400 specifies, based on the access right operation command 610 received from the queue management mechanism 110a, a queue group ID and an LU ID which are change targets and an access control bit after change ("1" (accept) or "0" (refuse)).

Figure 9:
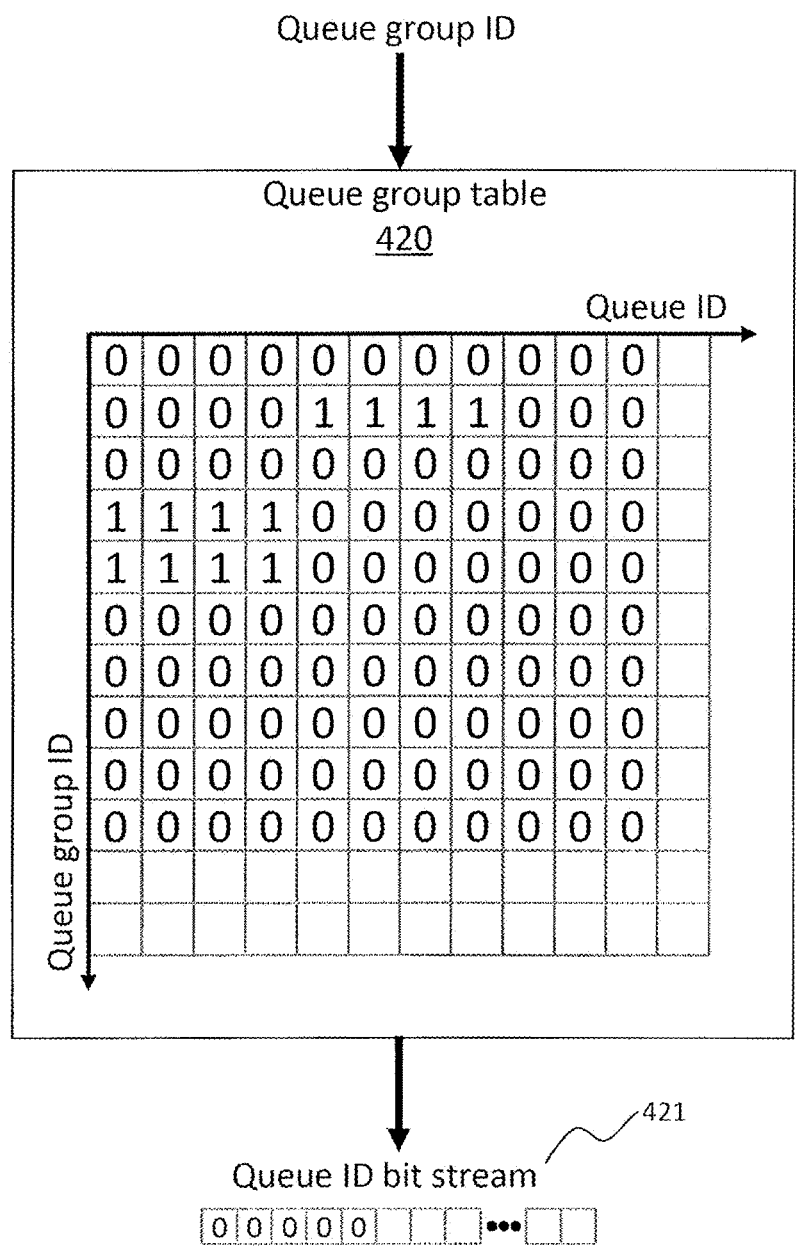
FIG. 9 shows a configuration example of a queue group table.

(B2) The access controller 400 acquires a queue ID bit string corresponding to the queue group ID that is a change target based on the queue group table 420 (refer to FIG. 9). In the queue ID bit string, a bit with a queue ID belonging to the queue group ID may be "1" and a bit with a queue ID not belonging to the queue group ID may be "0".

(B3) The access controller 400 changes each bit of the queue ID bit string acquired in (B2) described above to the AND with the access control bit after change ("1" (accept) or "0" (refuse)). In other words, when changing to accept access "1", the portion of "1" of the queue ID bit string remains the same. When changing to refuse access "0", the portion of "1" of the queue ID bit string is changed to "0".

(B4) The access controller 400 replaces an access control bit of all queue IDs corresponding to the LU ID that is a change target in the ACL 410 with the queue ID bit string having been changed to the AND in (B3) described above. At this point, the access controller 400 may perform exclusive control so as to prevent an access control bit from being output.

FIG. 9 shows a configuration example of the queue group table 420.

The queue group table 420 is a table for managing queue IDs belonging to a queue group ID. As shown in FIG. 9, the queue group table 420 may be a two-dimensional bitmap constituted by a plurality of queue IDs and a plurality of queue group IDs.

Acquiring the queue ID bit string in (B2) described above may be equivalent to acquiring a bit of each queue ID corresponding to the queue group ID that is a change target as a string from the queue group table 420.

The access controller 400 may change the queue group table 420 by the following processing.

When adding a queue ID to a queue group ID, the access controller 400 changes a bit specified by the queue group ID and the queue ID in the queue group table 420 to "1".

When deleting a queue ID from a queue group ID, the access controller 400 changes a bit specified by the queue group ID and the queue ID in the queue group table 420 to "0".

By the processing described above using FIGS. 8 and 9, the access controller 400 can collectively change access rights of a plurality of queue IDs belonging to a queue group ID to an LU ID that is a change target in the ACL 410. If an access control bit of each queue ID belonging to a queue group ID is to be changed one by one with respect to an LU ID of the ACL 410, a situation occurs during the change where access-accepted queues and access-refused queues coexist in the queue group. In this case, a phenomenon may occur in which an OS running on one server apparatus 200 is able to access the LU 320 using a certain CPU core 210 but is unable to access the same LU 320 using a different CPU core 210. In other words, a problem may arise in that the OS does not run normally. However, according to the processing described above using FIGS. 8 and 9, since access rights to the LU 320 can be collectively changed in units of a queue group to which queue IDs assigned to the CPU core 210 mounted to one server apparatus 200 belong, an occurrence of such a problem can be prevented.

FIG. 10 shows a configuration example of the access violation log 430.

The access violation log 430 records the number of access-refused I/O requests (the number of I/O requests that are access violations) and the like among I/O requests enqueued to a queue. The access controller 400 may count the number of such access-refused I/O requests for each queue group and record the number in the access violation log.

The access violation log 430 may include, as item values (field values), a queue group ID 1001, the number of read violations 1002, and the number of write violations 1003. The queue group ID 1001 is an ID of a queue group. Only an active queue group ID may be described in the queue group ID 1001. The number of read violations 1002 is the number of read requests which are enqueued to any of the queues belonging to a queue group with the ID 1001 and of which access has been refused. The number of write violations 1003 is the number of write requests which are enqueued to any of the queues belonging to a queue group with the ID 1001 and of which access has been refused. Moreover, the access violation log 430 may further include item values for recording other unaccepted operations.

In this manner, by counting the number of access violations in units of queue groups, a server apparatus with an abnormally large number of dispatches of access-refused I/O requests can be readily specified.

Figure 11:
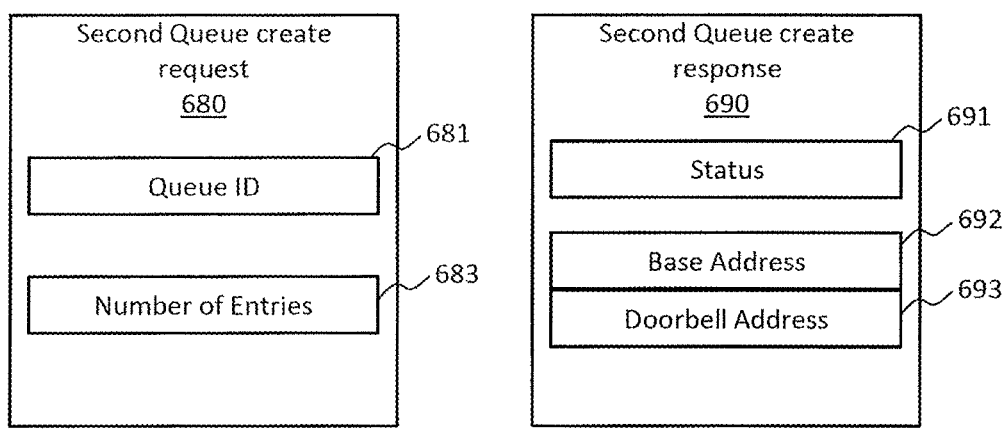
FIG. 11 shows configuration examples of a second queue create request and a second queue create response.

FIG. 11 shows configuration examples of the second queue create request 680 and the second queue create response 690.

The second queue create request 680 is a management command used by the device driver 230 to request creation of a queue to the queue management mechanism 110*a*. When the queue management mechanism 110*a* receives the second queue create request 680 from the device driver 230, the queue management mechanism 110*a* may generate the first queue create request 650 such as that shown in FIG. 4 based on the second queue create request 680 and transmit the first queue create request 650 to the storage sub device 300.

The second queue create request 680 may include, as item values (field values), a queue ID 681 and the number of entries 683. The queue ID 681 may be the same as the queue ID 651 of the first queue create request 650. The number of entries 683 may be the same as the number of entries 653 of the first queue create request 650.

The second queue create request 680 may not include an item value corresponding to the base address 652 of the first queue create request 650. This is because, as shown in FIG. 7, the I/O queue 500*b* related to the second server apparatus 200*b* is provided in the memory 220*a* of the first server apparatus 200*a*. However, a buffer related to the I/O queue 500*b* may be provided in the memory 220*b* of the second server apparatus 200*b*.

The second queue create response 690 is a management command used by the queue management mechanism 110*a* to respond to the device driver 230 with an execution result of the second queue create request 680. For example, the queue management mechanism 110*a* having received the first queue create response 660 such as that shown in FIG. 4 from the storage sub device 300 may generate the second queue create response 690 based on the first queue create response 660 and transmit the second queue create response 690 to the device driver 230.

The second queue create response 690 may include, as item values (field values), a status 691, a base address 692, and a doorbell address 693. The status 691 may be the same as the status 661 of the first queue create response 660. The base address 692 is an address of the I/O queue 500*b* provided in the memory 220*a* of the first server apparatus 200*a*. The doorbell address 693 is an address of a register for notifying the storage controller 310 that the I/O request 700 has been enqueued to the I/O queue 500*b*. The register of the address may be an address on the memory 220*a* of the first server apparatus 200*a*.

FIG. 12 represents an example of a queue assignment management screen 1000.

The queue assignment management screen 1000 is a screen for displaying and configuring contents of a queue assignment management list 1010. The queue assignment management list 1010 may be managed by the queue management mechanism 110*a*. The queue management mechanism 110*a* may generate and display the queue assignment management screen 1000 using the queue assignment management list 1010.

The queue assignment management list 1010 may include, as item values (field values), a server ID 1011, the maximum number of queues 1012, a queue group ID 1013, an assigned queue ID 1014, and an accessible LU ID 1015. The server ID 1011 is an ID of the server apparatus 200. The maximum number of queues 1012 is the maximum number of queues that can be assigned to the server apparatus 200 with the ID 1011. The queue group ID 1013 is an ID of a queue group associated with the server apparatus 200 with the ID 1011. The assigned queue ID 1014 is an ID of a queue belonging to a queue group with the ID 1013. The accessible LU ID 1015 is an ID of the LU 320 to which access from the queue ID 1014 belonging to the queue group ID 1013 is accepted.

A record in a first row of the queue assignment management screen 1000 shown in FIG. 12 indicates that the queue group ID 1013 "1" is associated with the server apparatus 200 with the server ID 1011 "1", queue IDs 1014 "0" to "7" belong to the queue group ID 1013 "1", and the I/O request 700 enqueued to the queue IDs 1014 is accepted to access the LUs 320 with the LU IDs 1015 "1" to "3".

A manager may operate buttons of operation items 1016 on the queue assignment management screen 1000 to remove records of the queue assignment management list 1010 or modify respective item values 1012 to 1015 of the records. Alternatively, a storage management unit 100 may automatically configure and change the respective item values 1012 to 1015 of the queue assignment management list 1010.

Figure 13:
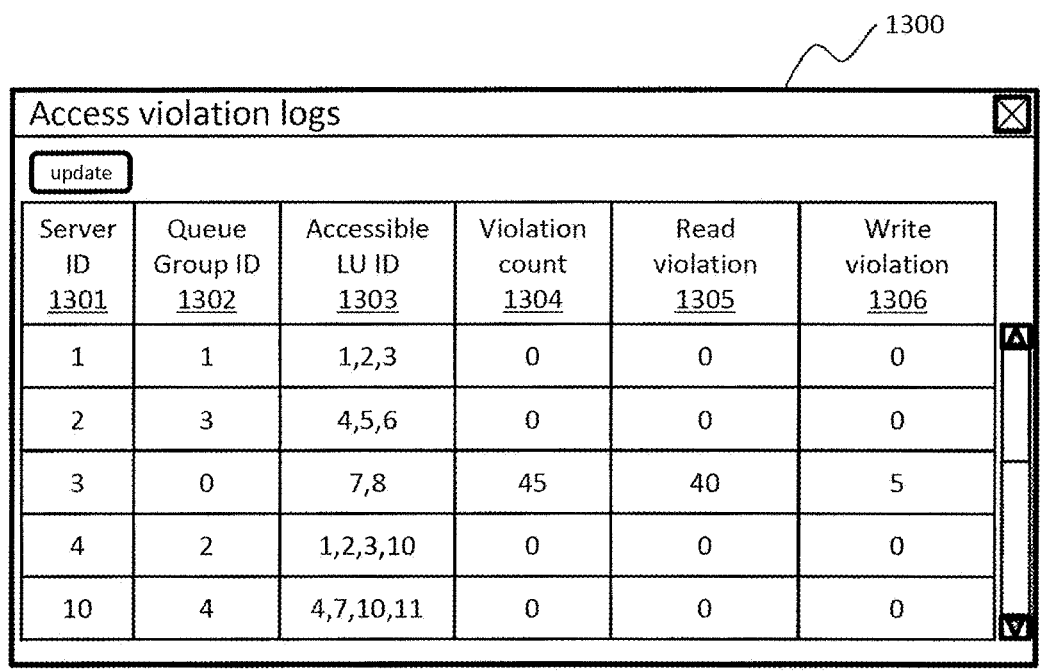
FIG. 13 shows an example of an access violation display screen.

FIG. 13 shows an example of an access violation display screen 1300.

The access violation display screen 1300 is a screen for displaying contents of the access violation log 430. The queue management mechanism 110*a* may display contents of the access violation log 430 of the storage sub device 300 on the access violation display screen 1300. Alternatively, the queue management mechanism 110*a* may count the number of returned I/O responses 710 including access-refused errors with respect to the I/O request 700 enqueued to each I/O queue 500 while checking the I/O queue 500 by polling, and display a count result on the access violation display screen 1300.

When the queue management mechanism 110*a* manages a plurality of storage sub devices 300, the queue management mechanism 110*a* may display a sum of the numbers of access violations to the plurality of storage sub devices 300 on the access violation display screen 1300. The access violation log 430 may be directly mapped to a PCIe address space. Alternatively, the storage controller 310 may transmit the access violation log 430 to the queue management mechanism 110*a* using a dedicated management command.

The access violation display screen 1300 may display, as item values, a server ID 1301, a queue group ID 1302, an accessible LU ID 1303, a violation count 1304, the number of read violations 1305, and the number of write violations 1306. The server ID 1301, the queue group ID 1302, and the accessible LU ID 1303 are as described earlier. The number of access violations 1304 represents the number of times the I/O request 700 that is an access violation has been dispatched from a queue belonging to a queue group ID with the ID 1302. The number of read violations 1305 represents the number of times a read request that is an access violation has been dispatched from a queue belonging to the queue group ID with the ID 1302. The number of write violations 1306 represents the number of times a write request that is an access violation has been dispatched from a queue belonging to the queue group ID with the ID 1302.

Figure 14:
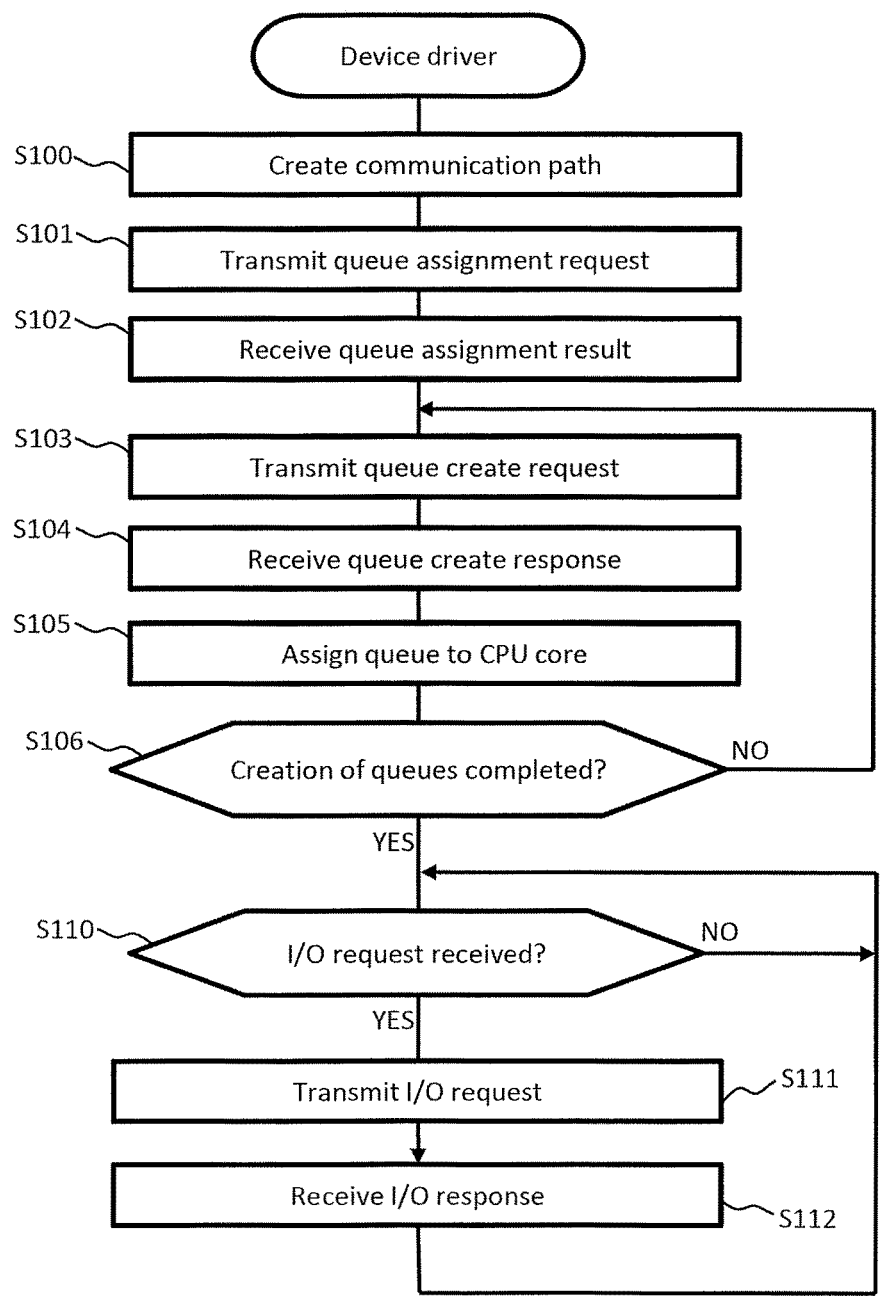
FIG. 14 is a flow chart showing an example of an operation performed when a device driver is loaded.

FIG. 14 is a flow chart showing an example of an operation performed after the device driver 230 is loaded to the server apparatus 200.

(S100) The device driver 230 creates a communication path for management commands between the queue management mechanism 110a and the device driver 230. Subsequently, the device driver 230 advances to step S101.

(S101) The device driver 230 transmits a queue assignment request 620 to the queue management mechanism 110a. Subsequently, the device driver 230 advances to step S102.

(S102) Upon receiving a queue assignment result 630 from the queue management mechanism 110a, the device driver 230 advances to step S103.

(S103) The device driver 230 selects one uncreated queue ID from the queue ID 634 included in the queue assignment result 630 and generates a second queue create request 680 including the selected queue ID and the number of entries 683. In addition, the device driver 230 transmits the second queue create request 680 to the queue management mechanism 110a. Subsequently, the device driver 230 advances to step S104.

(S104) Upon receiving a second queue create response 690 from the queue management mechanism 110a, the device driver 230 acquires the base address 692 and the doorbell address 693 from the received queue create response 690. Subsequently, the device driver 230 advances to step S105.

(S105) The device driver 230 assigns the I/O queue 500 with the queue ID selected in step S103 to one or more CPU cores 210. Subsequently, the device driver 230 advances to step S106.

(S106) When processing of all queue IDs included in the queue assignment result 630 is finished (YES), the device driver 230 advances to step S110, but when there is an unprocessed queue ID (NO), the device driver 230 returns to step S103.

(S110) When the device driver 230 receives the I/O request 700 from the CPU core 210 (or the OS) (YES), the device driver 230 advances to step S111, but if not (NO), the device driver 230 repeats step S110.

(S111) The device driver 230 enqueues the I/O request 700 received from the CPU core 210 to the I/O queue 500 assigned to the CPU core 210. In addition, the device driver 230 writes some value to the place specified by doorbell address 693 to notify the event that the I/O request 700 has been enqueued to the I/O queue 500. Due to the change to the doorbell address 693, the storage sub controller 310 can detect that the I/O request 700 has been enqueued to the I/O queue 500. When InfiniBand is used as communicating means, enqueuing of the I/O request 700 to the I/O queue 500 may be performed by "RDMA Write". Subsequently, the device driver 230 advances to step S112.

(S112) The device driver 230 receives the I/O response 710. The device driver 230 may detect the transmission of the I/O response 710 from the storage sub device 300 by monitoring a return-side state of the I/O queue 500 using polling, by a notification from the storage management unit 100, or the like. When InfiniBand is used as communicating means, the state monitoring or the notification described above may be performed by "RDMA Read". Subsequently, the device driver 230 returns to step S110.

According to the processing described above, each CPU core 210 of the server apparatus 200 is capable of transmitting the I/O request 700 to the storage sub device 300.

Figure 15:
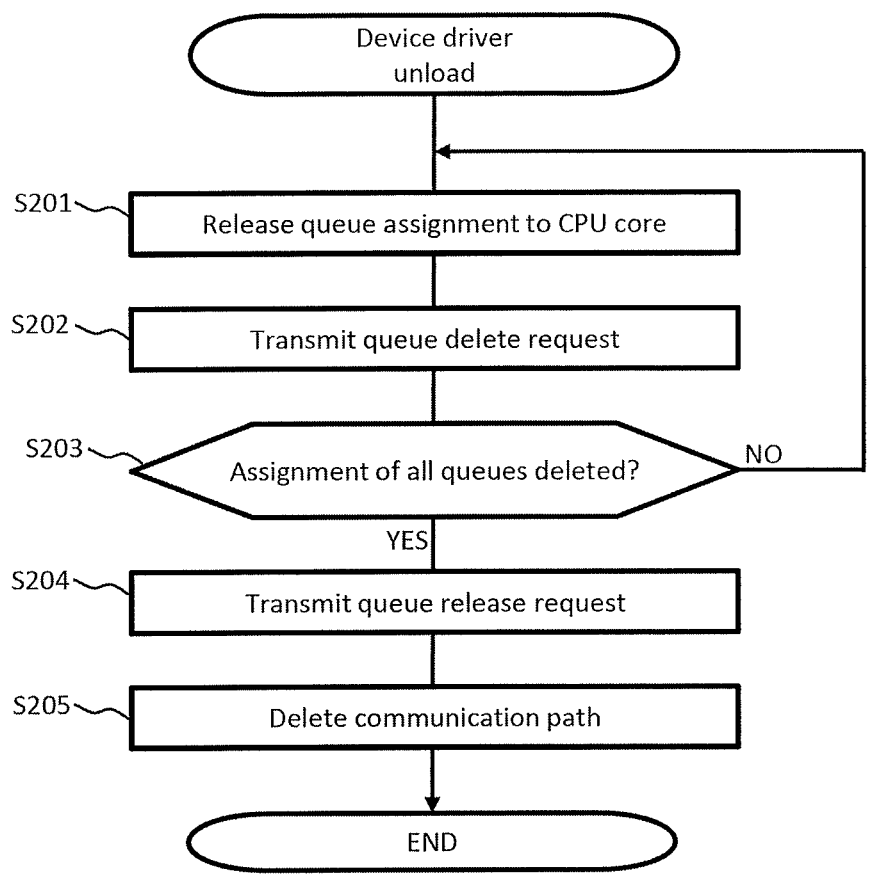
FIG. 15 is a flow chart showing an example of an operation performed when a device driver is unloaded.

FIG. 15 is a flow chart showing an example of an operation for unloading the device driver 230 from the server apparatus 200.

(S201) The device driver 230 releases an assignment with respect to one of the queue IDs currently being assigned to the CPU core 210. Subsequently, the device driver 230 advances to step S202.

(S202) The device driver 230 transmits a queue delete request 670 including the queue ID 671 of which assignment has been released to the queue management mechanism 110a. Subsequently, the device driver 230 advances to step S203.

(S203) When assignment has been released with respect to all queue IDs having been assigned (YES), the device driver 230 advances to step S204, but if not (NO), the device driver 230 returns to step S201.

(S204) The device driver 230 transmits the queue release request 640 to the queue management mechanism 110a. Subsequently, the device driver 230 advances to step S205.

(S205) The device driver 230 deletes the communication path for management commands between the queue management mechanism 110a and the device driver 230.

According to the processing described above, all I/O queues 500 having been assigned to the server apparatus 200 can be released.

Figure 16:
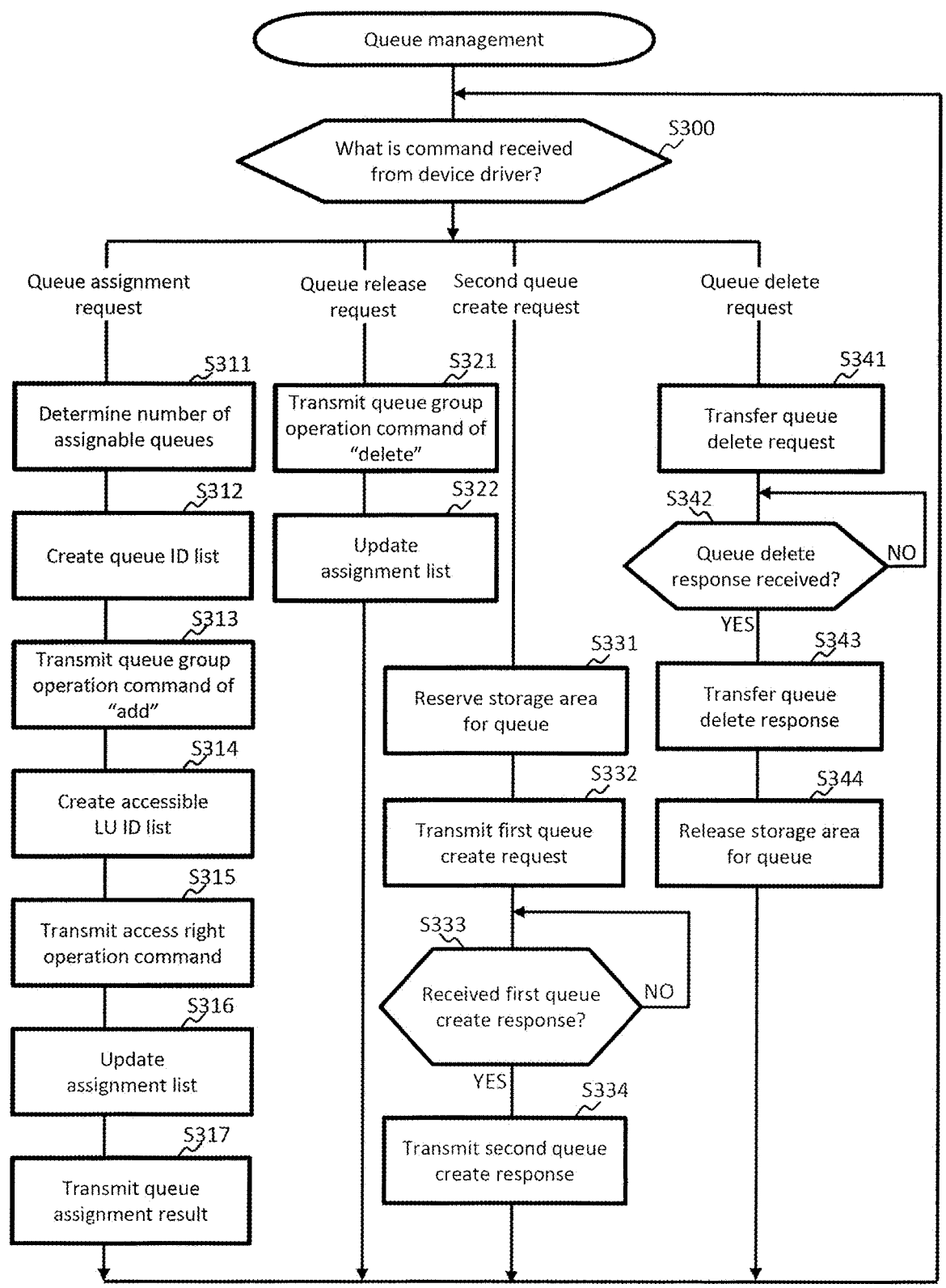
FIG. 16 is a flow chart showing an operation example of a queue management mechanism.

FIG. 16 is a flow chart showing an operation example of the queue management mechanism 110a.

(S300) The queue management mechanism 110a determines which of the queue assignment request 620, the queue release request 640, the second queue create request 680, and the queue delete request 670 has been received.

<When Queue Assignment Request 620 is Received>

(S311) The queue management mechanism 110a finds a record having the server ID 1011 that is a dispatch source of the queue assignment request 620 from a queue assignment management list configured in advance. In addition, the queue management mechanism 110a compares the maximum number of queues 1012 of the found record with the number of requested queues 621 of the queue assignment request 620, and determines whichever is smaller as the number of queues to be assigned. Subsequently, the queue management mechanism 110a advances to step S312.

(S312) The queue management mechanism 110a specifies a queue ID of an unused queue resource 311 in the storage sub device 300. The queue management mechanism 110a creates a queue ID list including the unused queue ID by the number of assigned queues 631. Subsequently, the queue management mechanism 110a advances to step S313.

(S313) The queue management mechanism 110a generates a queue group operation command 600 in which a queue group ID that is a target of addition of a queue ID is configured as the queue group ID 601, "add" is configured as the operation type 602, and the queue ID list created in step S312 is configured as the queue ID list 603. In addition, the queue management mechanism 110a transmits the generated queue group operation command 600 to the storage sub device 300. Accordingly, the queue ID 604 included in the queue ID list 603 is added to a queue group with the ID 601. In other words, the queue group ID 601 is created. Subsequently, the queue management mechanism 110a advances to step S314.

(S314) The queue management mechanism 110a acquires the accessible LU ID 1015 from a record of the queue assignment management list found in step S311. In addition, the queue management mechanism 110a creates an LU ID list including the acquired accessible LU ID. Subsequently, the queue management mechanism 110a advances to step S315.

(S315) The queue management mechanism 110a generates an access right operation command 610 in which a queue group ID that is a target of an access right operation is configured as the queue group ID 611, "accept" access is configured as the operation type 612, and the LU ID list created in step S314 is configured as the LU ID list 613. In addition, the queue management mechanism 110a transmits the generated access right operation command 610 to the storage sub device 300. Accordingly, access from the queue group ID 611 to the LU ID 614 included in the LU ID list 613 is accepted. Subsequently, the queue management mechanism 110a advances to step S316.

(S316) The queue management mechanism 110a reflects the addition of the queue ID to the queue group ID and contents of change regarding whether to accept or refuse access from the queue group ID to the LU ID on the queue assignment management list. Subsequently, the queue management mechanism 110a advances to step S317.

(S317) The queue management mechanism 110a generates a queue assignment result 630 in which the number of queues to be assigned as determined in step S311 is configured as the number of assigned queues 631 and the queue ID list created in step S312 is configured as the queue ID list 633. In addition, the queue management mechanism 110a transmits the generated queue assignment result 630 to the device driver 230. Subsequently, the queue management mechanism 110a returns to step S300.

According to the processing described above, the device driver 230 can find out the number of queues that can be assigned to itself.

<When Queue Release Request 640 is Received>

(S321) The queue management mechanism 110a finds a record having the server ID 1011 that is a dispatch source of the queue release request 640 from a queue assignment management list. In addition, the queue management mechanism 110a generates a queue group operation command 600 in which the queue group ID 1013 of the specified record is configured as the queue group ID 601 and "delete" is configured as the operation type 602. Furthermore, the queue management mechanism 110a transmits the generated queue group operation command 600 to the storage sub device 300. Subsequently, the queue management mechanism 110a advances to step S322.

(S322) The queue management mechanism 110a specifies a record having the server ID 1011 that is a dispatch source of the queue release request 640 from the queue assignment management list. In addition, the queue management mechanism 110a deletes all assigned queue IDs 1014 in the found record. Subsequently, the queue management mechanism 110a returns to step S300.

According to the processing described above, a queue that is no longer required can be released and reused.

<When Second Queue Create Request 680 is Received>

(S331) The queue management mechanism 110a calculates a size of a queue with the queue ID 681 based on the number of entries 683 of the second queue create request 680. In addition, the queue management mechanism 110a reserves a storage area with the calculated size in the memory 220a of the first server apparatus 200a. Subsequently, the queue management mechanism 110a advances to step S332.

(S332) The queue management mechanism 110a generates the first queue create request 650 in which the queue ID 681 of the second queue create request 680 is configured as the queue ID 651, an address of the storage area reserved on the memory 220a as described above is configured as the base address 652, and the number of entries 653 of the second queue create request 680 is configured as the number of entries 653. In addition, the storage management unit 100 transmits the generated first queue create request 650 to the storage sub device 300.

(S333) When the queue management mechanism 110a receives the first queue create response 660 from the storage sub device 300 (YES), the queue management mechanism 110a advances to step S334.

(S334) The queue management mechanism 110a generates the second queue create response 690 in which the status 661 of the first queue create response 660 is configured as the status 691, the base address 652 reserved for a queue is configured as the base address 692, and an address of a storage area for a doorbell is configured as the doorbell address 693. In addition, the queue management mechanism 110a transmits the generated second queue create response 690 to the device driver 230. Subsequently, the queue management mechanism 110a returns to step S300.

According to the processing described above, a queue is created.

<When Queue Delete Request 670 is Received>

(S341) The queue management mechanism 110a transfers the queue delete request 670 to the storage sub device 300.

(S342) When the queue management mechanism 110a receives the queue delete response from the storage sub device 300 (YES), the queue management mechanism 110a advances to step S343.

(S343) The queue management mechanism 110a transfers the received queue delete response to the device driver 230. Subsequently, the queue management mechanism 110a advances to step S344.

(S344) The queue management mechanism 110a releases the storage area having been reserved for a queue with the queue ID 671 of the queue delete request 670. Subsequently, the queue management mechanism 110a returns to step S300.

According to the processing described above, a queue is deleted.

Figure 17:
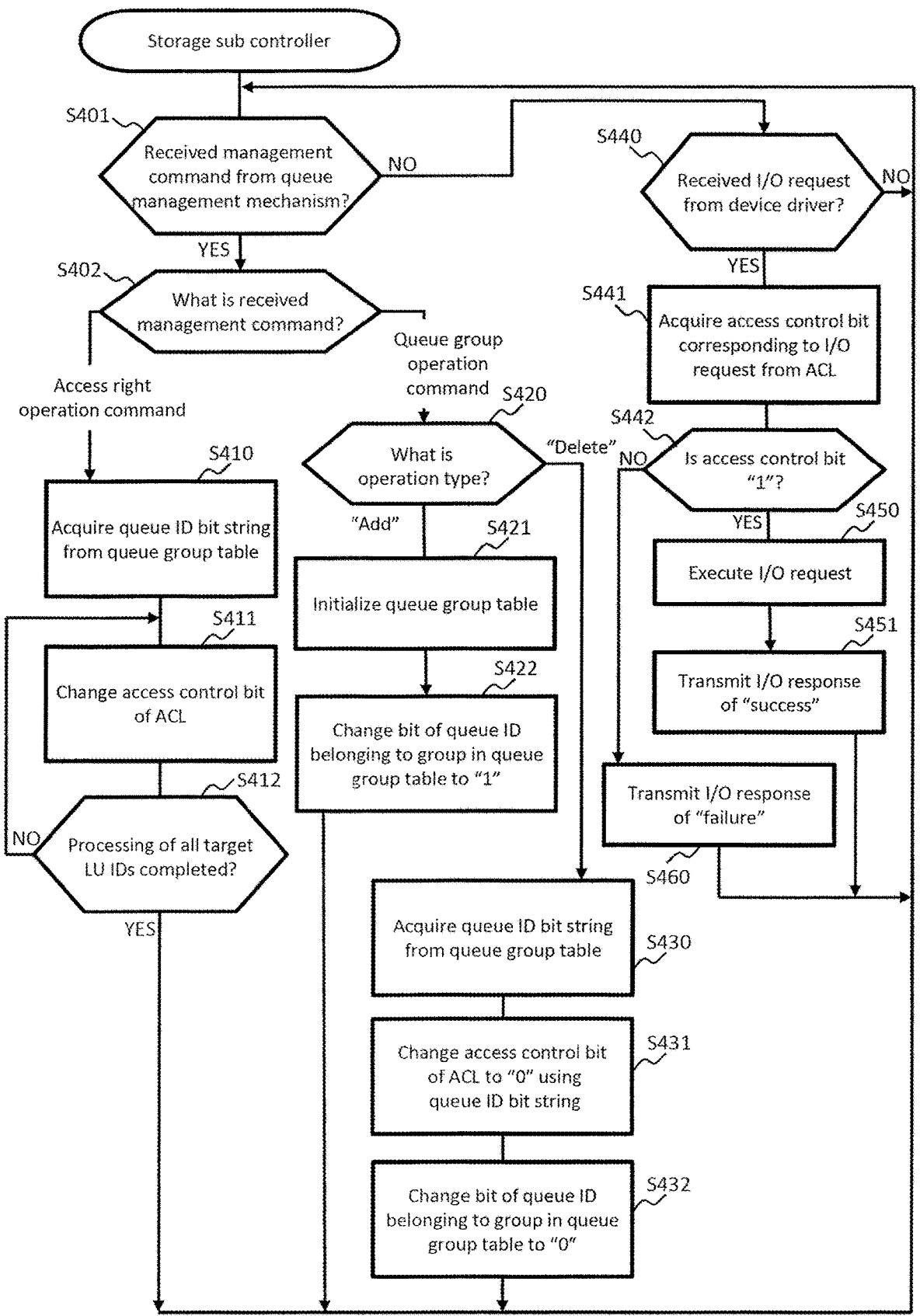
FIG. 17 is a flow chart showing an operation example of a storage sub controller.

FIG. 17 is a flow chart showing an operation example of the storage sub controller 310.

(S401) When the storage sub controller 310 receives a management command from the queue management mechanism 110a (YES), the storage sub controller 310 advances to step S402, but if not (NO), the storage sub controller 310 advances to step S440.

(S402) When the management command received in step S401 is an "access right operation command", the storage sub device 300 advances to step S410, but when the management command received in step S401 is a "queue group operation command", the storage sub device 300 advances to step S420.

(S440) When the storage sub controller 310 receives the I/O request 700 from the device driver 230 (YES), the storage sub controller 310 advances to step S441, but if not (NO), the storage sub controller 310 returns to step S401.

<When Access Right Operation Command is Received>

(S410) The storage sub controller 310 acquires, using the queue group table 420, the queue ID bit string 421 corresponding to the queue group ID 611 of the access right operation command 610. Subsequently, the storage sub controller 310 advances to step S411.

(S411) The storage sub controller 310 selects one LU ID 614 not yet subjected to a change process of an access control bit from the LU ID list 613 of the access right operation command 610. In addition, using the selected LU ID 614, the operation type 612 ("accept" or "refuse") of the access right operation command 610, and the queue ID bit string 421 acquired in step S410, the storage sub device 300 collectively changes all access control bits of the ACL 410 corresponding to the selected LU ID 614. Subsequently, the storage sub controller 310 advances to step S412.

(S412) The storage sub controller 310 returns to step S401 when a change process of an access control bit has been finished for all LU IDs 614 in the LU ID list 613 of the access right operation command 610, but returns to step S411 when there is an LU ID 614 not yet to be subjected to the change process.

According to the processing described above, an access right to an LU of a plurality of queues belonging to a queue group can be collectively changed. As a result, a problem in that access-accepted queues and access-refused queues coexist in a queue group while access rights are being changed can be avoided.

<When Queue Group Operation Command is Received>

(S420) When the operation type 602 of the queue group operation command 600 is "add" (YES), the storage sub controller 310 advances to step S421, but when the operation type 602 is "delete" (NO), the storage sub controller 310 advances to step S430.

(S421) The storage sub controller 310 initializes, in the queue group table 420, all bits corresponding to the queue group ID 601 of the queue group operation command 600 to "0" (refuse). Subsequently, the storage sub controller 310 advances to step S422.

(S422) The storage sub controller 310 changes, in the queue group table 420, a bit specified by the queue group ID 601 of the queue group operation command 600 and each queue ID 604 included in the queue ID list 603 to "1" (accept). Subsequently, the storage sub controller 310 returns to step S401.

(S430) The storage sub controller 310 acquires, from the queue group table 420, a queue ID bit string 421 corresponding to the queue group ID 601 of the queue group operation command 600. Subsequently, the storage sub controller 310 advances to step S431.

(S431) The storage sub controller 310 changes, with respect to bit strings of all LU IDs in the ACL 410, a bit of a portion corresponding to "1" in the queue ID bit string acquired in step S430 to "0" (refuse). Subsequently, the storage sub controller 310 advances to step S432.

(S432) The storage sub controller 310 changes, in the queue group table 420, with respect to a bit string with the queue group ID 601 of the queue group operation command 600, a bit of a portion of a queue ID belonging to the queue group ID 601 to "0". In addition, the storage sub controller 310 removes a record corresponding to the queue group ID 601 from the access violation log 430. Subsequently, the storage sub controller 310 returns to step S401.

According to the processing described above, the queue group table 420 is changed based on instructions from the queue management mechanism 110a.

<When I/O Request is Received>

(S441) The storage sub controller 310 acquires, from the ACL 410, an access control bit specified by the ID 510 of a queue to which the I/O request 700 is enqueued and the LU ID 705 of the I/O request 700. Subsequently, the storage sub controller 310 advances to step S442.

(S442) The storage sub controller 310 advances to step S450 when the acquired access control bit is "1" (accept) but advances to step S460 when the acquired access control bit is "0" (refuse).

(S450) The storage sub controller 310 executes processing (read processing, write processing, or the like) based on the operation type 701 of the I/O request 700. Subsequently, the storage sub controller 310 advances to step S451.

(S451) The storage sub controller 310 generates an I/O response 710 in which "success" is configured as the status 711, and transmits the I/O response 710 to the device driver 230. Subsequently, the storage sub controller 310 returns to step S401.

(S460) The storage sub controller 310 generates an I/O response 710 in which "failure" is configured as the status 711 and "access refused" is configured as the error information 712, and transmits the I/O response 710 to the device driver 230. Subsequently, the storage sub controller 310 returns to step S401.

According to the processing described above, the I/O request dispatched from the device driver 230 is executed.

Second Embodiment

Figure 18:
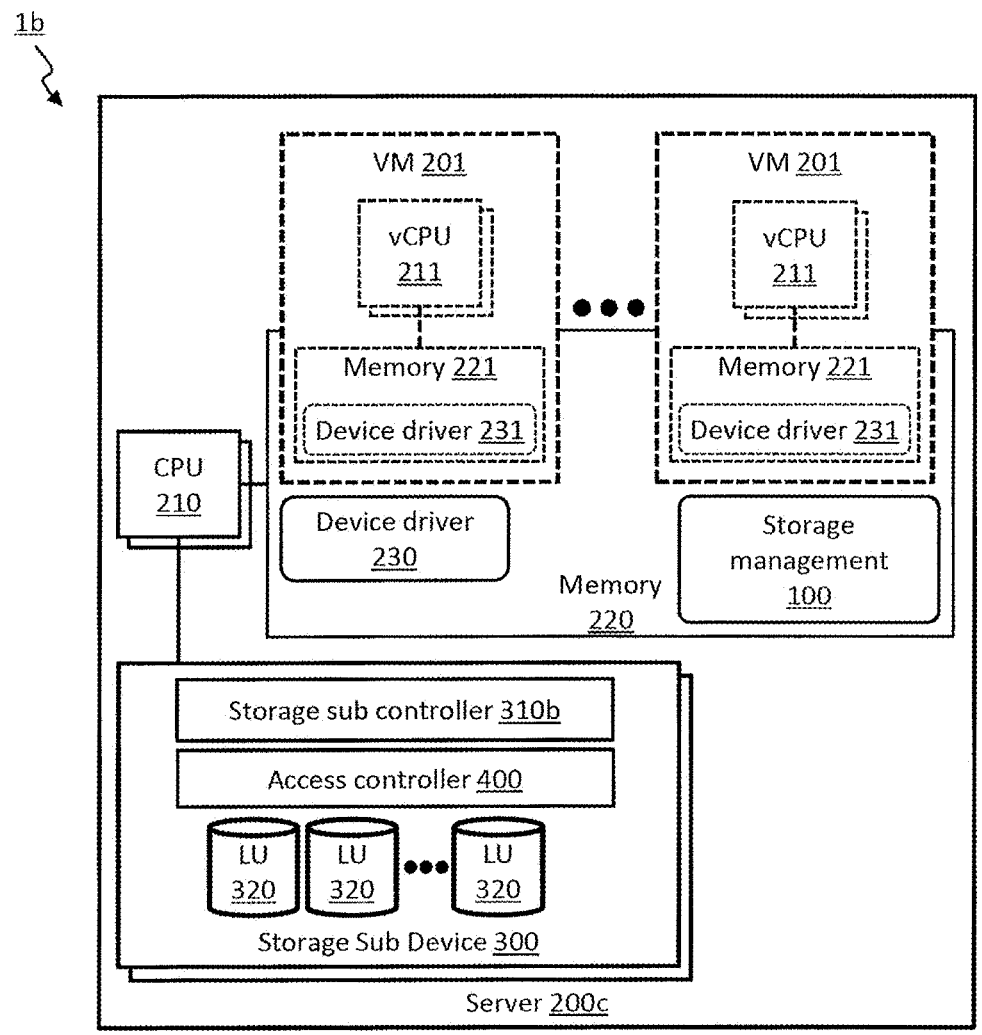
FIG. 18 shows an example of a hardware configuration of a computer system according to a second embodiment.
Figure 19:
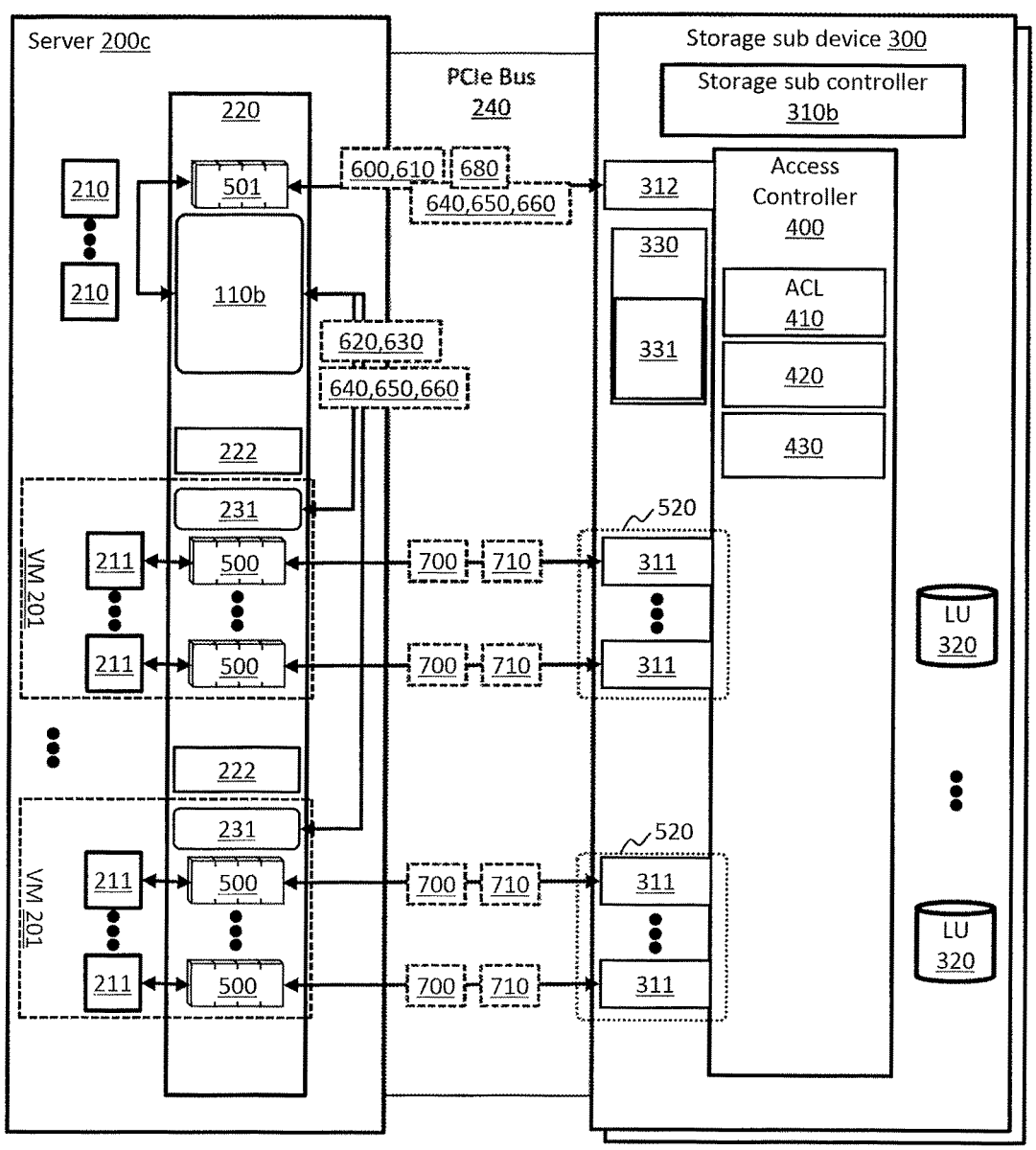
FIG. 19 shows an example of a logical configuration of a computer system according to the second embodiment.

FIG. 18 shows a hardware configuration example of a computer system 1b according to a second embodiment. FIG. 19 shows a logical configuration example of the computer system 1b according to the second embodiment.

The computer system 1b includes a server apparatus 200c. The server apparatus 200c includes a CPU core 210, a memory 220, and a storage sub device 300. These elements are coupled via a PCIe bus 240 so as to be capable of bidirectional communication.

The memory 220 of the server apparatus 200c may store a program for realizing a queue management mechanism 110b and a program for realizing a device driver 230. The server apparatus 200c may include a virtualization mechanism (for example, a hypervisor) for realizing a VM 201. The virtualization mechanism may be a program or a dedicated hardware chip. The server apparatus 200c may be capable of running one or more VMs 201 using the virtualization mechanism. Each VM 201 may include a virtual CPU 211 and a virtual memory 221 and may run a guest OS.

A device driver 231 may be stored in the memory 221 of the VM 201. The device driver 231 may be equipped with functions similar to those of the device driver 230 according to the first embodiment. An I/O queue 500 may be assigned to each VM 201.

The computer system 1b may be capable of using a management command 800 for transmitting a physical address (a Guest Physical Address (GPA)) of a VM (a guest OS) in association with a queue group 520 to the storage sub device 300. This enables handling of the VM 201.

The storage sub device 300 includes an Input/Output Memory Management Unit (IOMMU) 330. The IOMMU 330 may include a function for referring to a GPA to HPA conversion table list 331 and mutually converting between a GPA and an HPA.

The CPU 211 of the VM 201 enqueues the I/O request 700 to the I/O queue 500 assigned to the CPU 211. The CPU 211 of the VM 201 configures a GPA that is an address in the memory 220 of the VM 201 to a buffer address 704 of the I/O request 700. The GPA must be converted into a Host Physical Address (HPA) that is an address in the memory 220 of the server apparatus 200c. The IOMMU 330 includes a function for mutually converting between the GPA and the HPA. The IOMMU 330 according to the present embodiment is provided in the storage sub device 300 and includes a function for converting a GPA into an HPA in queue group units.

Figure 20:
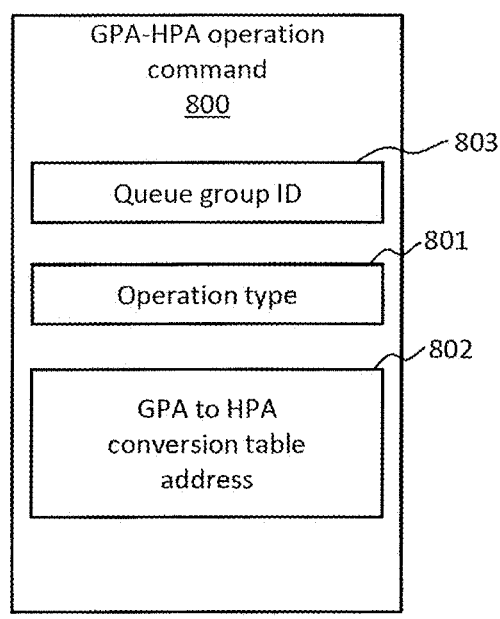
FIG. 20 shows a configuration example of a GPA-HPA operation command.

FIG. 20 shows a configuration example of a GPA-HPA operation command 800.

The GPA-HPA operation command 800 is a command for supporting a conversion operation from a GPA into an HPA in queue group units. The GPA-HPA operation command 800 may include, as item values (field values), a queue group ID 803, an operation type 801, and a GPA to HPA conversion table address 802.

The queue group ID 803 is an ID of a queue group that is an operation target of the GPA-HPA operation command 800. The operation type 801 is information indicating what kind of operation is to be performed on a queue group with the ID 803. The GPA to HPA conversion table address 802 is an address indicating a storage destination of the GPA to HPA conversion table 221.

Next, an example of a queue assignment management screen according to the second embodiment will be described with reference to FIG. 12.

A queue assignment management list according to the second embodiment may include the same item values (field values) as the queue assignment management list shown in FIG. 12 with the exception of replacing the server ID 1011 with a VM ID. A VM ID is an ID of the VM 201. Therefore, the queue assignment management screen according to the second embodiment may be a screen created by replacing the server ID 1011 in FIG. 12 with a VM ID.

Next, an example of an access violation display screen according to the second embodiment will be described with reference to FIG. 13.

The access violation display screen according to the second embodiment may include the same item values as the access violation display screen 1300 shown in FIG. 13 with the exception of replacing the server ID 1301 with a VM ID.

Figure 21:
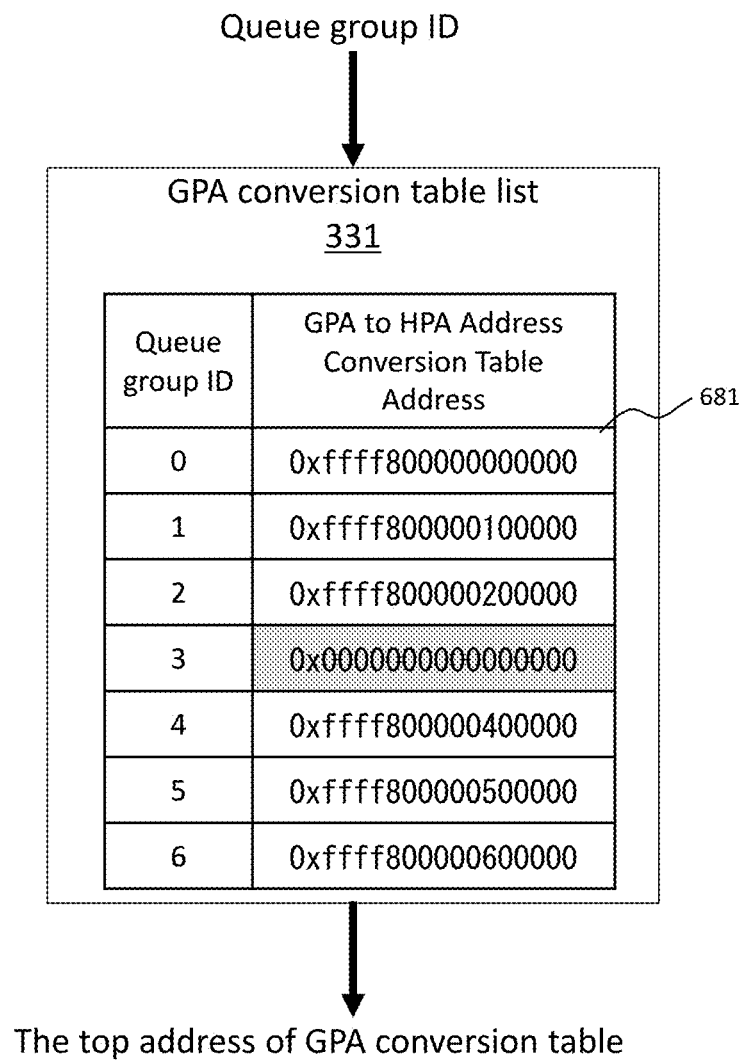
FIG. 21 shows a configuration example of a GPA to HPA conversion table list.

FIG. 21 shows a configuration example of a GPA to HPA conversion table list 331.

The GPA to HPA conversion table list 331 is a list which associates a queue group with a GPA to HPA conversion table. The GPA to HPA conversion table list 331 may include, as item values (field values), a queue group ID and a top address where a GPA to HPA conversion table is stored.

The buffer address 704 related to the I/O request 700 enqueued from the CPU 211 of the VM 201 to the I/O queue 500 is a GPA. Therefore, the storage sub controller 310 having received the I/O request 700 must convert the buffer address 704 (a GPA) into an HPA by, for example, the processes of (C1) to (C5) described below.

(C1) The storage sub controller 310 specifies a queue group ID to which a queue having acquired the I/O request 700 belongs.

(C2) The storage sub controller 310 acquires, from the GPA to HPA conversion table list 331, the top address 681 of a GPA to HPA conversion table corresponding to the specified queue group ID.

(C3) The storage sub controller 310 inputs the buffer address 704 (a GPA) and the acquired top address 681 of the GPA to HPA conversion table to the IOMMU 330.

(C4) The IOMMU 330 converts the input GPA into an HPA based on the GPA to HPA conversion table stored at the top address 681, and returns the HPA to the storage sub controller 310. When the server apparatus 200c is constituted by a CPU and a chipset manufactured by Intel Corporation, the GPA to HPA conversion may be performed based on the specifications described in NPL 2. When the server apparatus 200c is constituted by a CPU and a chipset manufactured by Advanced Micro Devices, Inc., the GPA to HPA conversion may be performed based on the specifications described in NPL 3.

(C5) The storage sub device 300 accesses the acquired HPA.

Next, with reference to FIGS. 14 and 15, examples of operations when the device driver 231 is loaded to the VM 201 and when the device driver 231 is unloaded according to the second embodiment will be described.

In the case of the second embodiment, in the flow chart shown in FIG. 14, the step S100 of forming a communication path between the storage management unit 100 and the device driver 231 is omitted. In addition, in the flow chart shown in FIG. 15, the step S205 of removing the formed communication path is omitted. This is because the VM 201 that includes the device driver 231 and the storage management unit 100 are programs that run on substantially the same server apparatus 200c and, consequently, there is no need to form a communication path.

Next, an operation example of the queue management mechanism 110b according to the second embodiment will be described with reference to FIG. 16. It should be noted that only steps which differ from the flow chart shown in FIG. 16 will be described and that descriptions of similar steps will be omitted.

<When Queue Assignment Request 620 is Received>

In place of step S311, the queue management mechanism 110b finds a record having the VM ID that is a dispatch source of the queue assignment request 620 from a queue assignment management list configured in advance. In addition, the queue management mechanism 110b compares the maximum number of queues 1012 of the found record with the number of requested queues 621 of the queue assignment request 620, and determines whichever is smaller as the number of queues to be assigned. Subsequently, the queue management mechanism 110b advances to step S312.

After step S316, the queue management mechanism 110b generates a GPA-HPA operation command 800 in which a queue group ID that is an access control target is configured as the queue group ID 803, "add" is configured as the operation type 801, and a top address of a storage destination of the GPA to HPA conversion table 221 is configured as the GPA to HPA conversion table address 802. In addition, the queue management mechanism 110b transmits the generated GPA-HPA operation command 800 to the storage sub controller 310. Subsequently, the queue management mechanism 110b advances to step S317.

<When Queue Release Request 640 is Received>

In place of step S322, the queue management mechanism 110b finds a record having the VM ID that is a dispatch source of the queue release request 640 from the queue assignment management list. In addition, the queue management mechanism 110b deletes all assigned queue IDs 1014 in the specified record. Subsequently, the queue management mechanism 110b returns to step S300.

<When Second Queue Create Request 680 is Received>

The queue management mechanism 110b does not perform step S331.

<When Queue Delete Request 670 is Received>

The queue management mechanism 110b does not perform step S344.

Next, an operation example of the storage sub controller 310b according to the second embodiment will be described with reference to FIG. 17. It should be noted that only steps which differ from the flow chart shown in FIG. 17 will be described and that descriptions of similar steps will be omitted.

In step S402, the storage sub controller 310b advances to step S470 described below when the management command received in step S401 is the GPA-HPA operation command 800.

<When GPA-HPA Operation Command 800 is Received>

(S470) The storage sub controller 310b acquires, from the GPA-HPA operation command 800, the queue group ID 803, the operation type 801, and the GPA to HPA conversion table address 802. In addition, when the acquired operation type 801 is "add", the storage sub controller 310b associates the acquired queue group ID 803 with the acquired GPA to HPA conversion table address 802 and adds the associated queue group ID 803 and GPA to HPA conversion table address 802 to the GPA to HPA conversion table list 331. Subsequently, the storage sub controller 310b returns to step S401.

Third Embodiment

Figure 22:
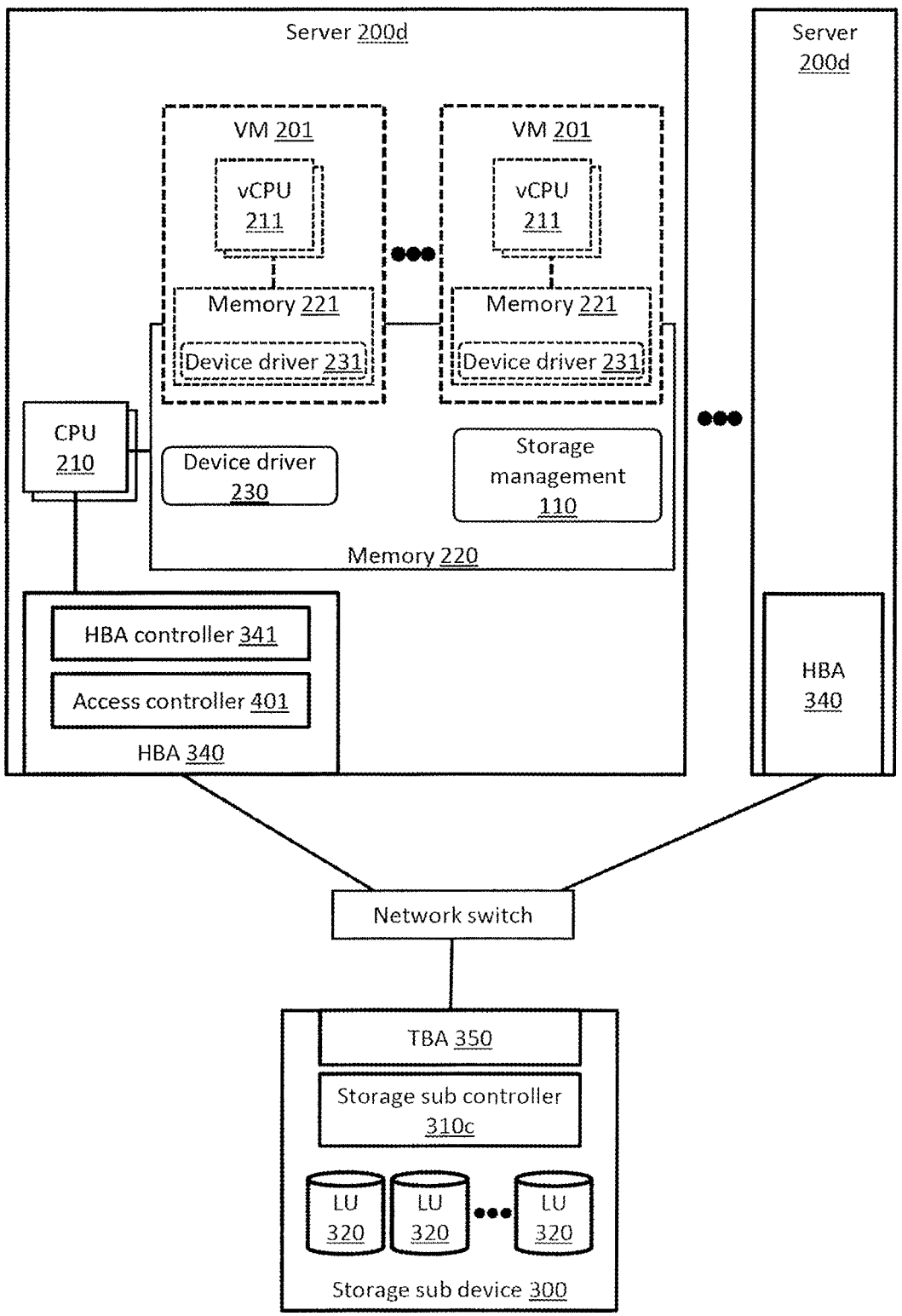
FIG. 22 shows an example of a hardware configuration of a computer system according to a third embodiment.
Figure 23:
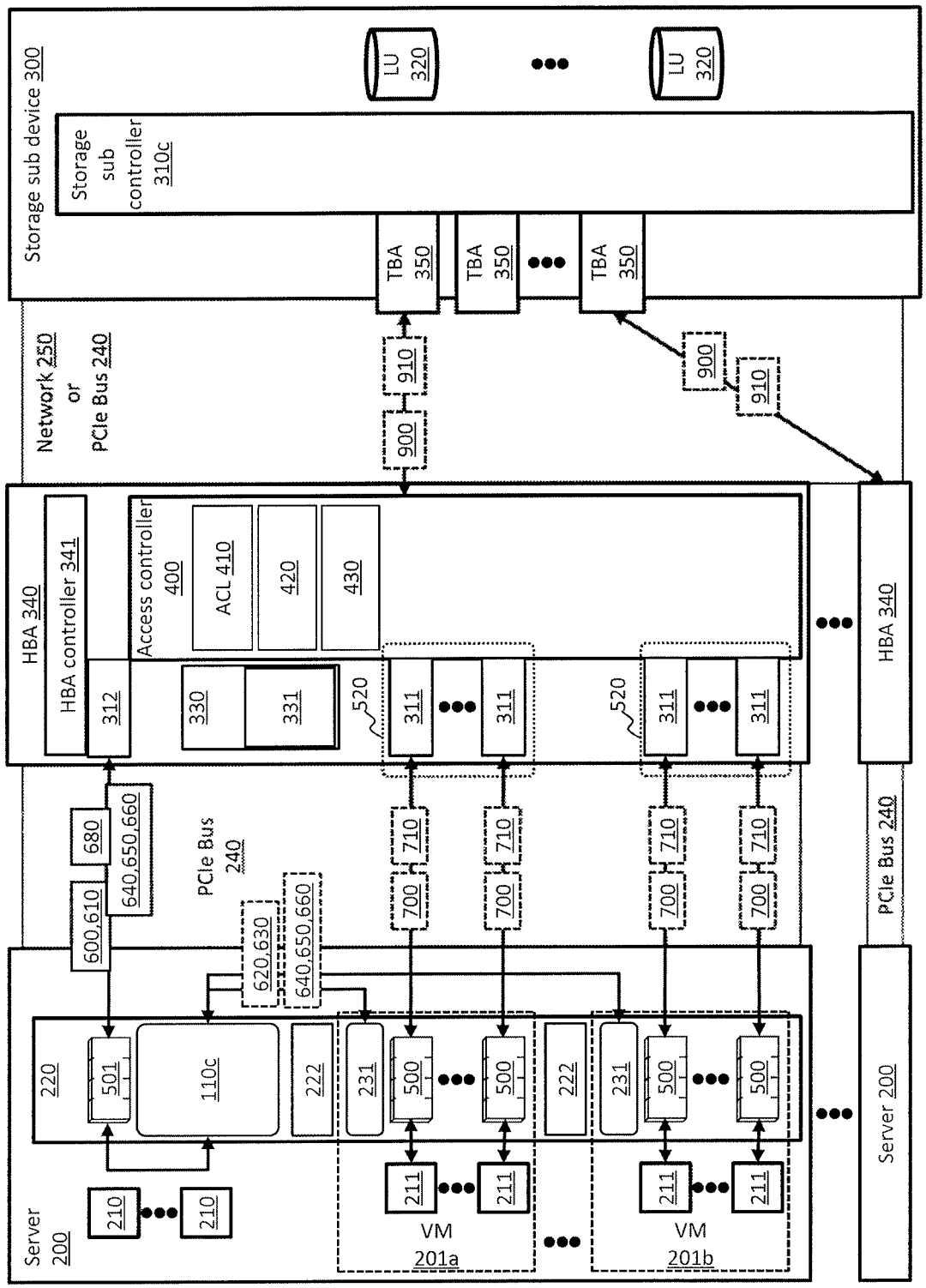
FIG. 23 shows an example of a logical configuration of a computer system according to the third embodiment.

FIG. 22 shows an example of a hardware configuration of a computer system 1c according to a third embodiment. FIG. 23 shows an example of a logical configuration of the computer system 1c according to the third embodiment.

The computer system 1c includes one or more server apparatuses 200d and a storage sub device 300. The server apparatus 200d may include a CPU 210, a memory 220, and a Host Bus Adaptor (HBA) 340. These elements may be coupled via a PCIe bus 240 so as to be capable of bidirectional communication. The HBA 340 of each server apparatus 200d and the storage sub device 300 may be coupled to each other via a network 250 so as to be capable of bidirectional communication. Examples of the network 250 include the Ethernet, Fibre Channel, and InfiniBand. Moreover, the network 250 may be a PCIe bus. A plurality of the server apparatuses 200d may be capable of accessing one storage sub device 300. In addition, the storage sub device 300 may exist in plurality in the same network 250. The server apparatus 200d may be capable of running one or more VMs 201 using a virtualization mechanism. A configuration of the VM 201 may be similar to that of the second embodiment. A plurality of VMs 201 in one server apparatus 200d may share the HBA 340 of the server apparatus 200d.

In the third embodiment, the HBA 340 may include an access controller 400. In other words, in the third embodiment, the access controller 400 of the HBA 340 may determine an access right with respect to the I/O request 700 enqueued by the CPU 211 of the VM 201 to the I/O queue 500. In addition, when the access controller 400 of the HBA 340 determines to accept access by the I/O request 700, the access controller 400 may transfer an I/O request 900 corresponding to the I/O request 700 to the storage sub device 300 via the network 250. When the access controller 400 of the HBA 340 determines to refuse access by the I/O request, the access controller 400 need not transfer the I/O request 900 corresponding to the I/O request 700 to the storage sub device 300. The I/O request 700 and the I/O request 900 may be a same I/O command or may be I/O commands converted into different systems. An I/O command related to the I/O request 700 may conform to the NVMe standard and an I/O command related to the I/O request 900 may conform to the SCSI standard.

A switching apparatus which performs routing control may exist along the network 250. In addition, the switching apparatus may include an independent access control function. For example, the access control function may be a function for restricting an available network band for each HBA, a function for limiting accessible storage sub devices (a control path mechanism), or the like.

The storage sub device 300 may include an access control function unique to the storage sub device. This access control function may be a function for limiting accessible LUs 320 for each Target Bus Adapter (TBA) 350 that is a network coupling port or limiting access to the LU 320 in units of IDs included in the HBA 340.

These access control functions may be configured so as to be interlocked with the access control function based on units of queue groups described in the second embodiment. In this case, the queue management mechanism 110c may dispatch the queue group operation command 600 and the access right operation command 610 to the switching apparatus described above and/or the storage sub device.

Next, an operation example of the access controller 400 of the HBA 340 will be described with reference to FIG. 17. It should be noted that only steps which differ from the flow chart shown in FIG. 17 will be described and that descriptions of similar steps will be omitted.

In S450, the access controller 400 of the HBA 340 converts the I/O request 700 into an I/O request 900 and transmits the I/O request 900 to the storage sub device 300.

In S451, upon receiving an I/O response 910 to the I/O request 900 from the storage sub device 300, the access controller 400 of the HBA 340 converts the I/O response 910 into an I/O response 710. In addition, the access controller 400 transmits the I/O response 710 to the device driver 231.

While several embodiments have been described above, it is to be understood that the described embodiments merely represent examples for illustrating the present invention and that the scope of the present invention is not limited to the embodiments. The present invention can also be implemented in various other modes.

REFERENCE SIGNS LIST

1 Computer system
200 Server apparatus
300 Storage sub device
110 Queue management mechanism
230 Device driver
310 Storage sub controller
400 Access controller
210 CPU core
201 VM
320 LU

The invention claimed is:

1. A computer system, comprising:
at least one computer including a memory and a plurality of CPU cores; and
a storage sub device including a plurality of logical storage units constituted by a storage device, wherein
in the computer:
a plurality of queues are configured in the memory;
each of the plurality of queues is assigned at least one of the plurality of CPU cores; and
to each of the plurality of queues, an I/O command dispatched from a CPU core assigned to each of the plurality of queues to a logical storage unit is to be enqueued, and
the computer system includes an access controller that determines whether to accept or refuse access from each of the plurality of queues to each logical storage unit.

2. The computer system according to claim 1, further including
queue group information for managing the plurality of queues configured in the computer as a group, wherein whether to accept or refuse access to each logical storage unit with respect to each of the plurality of queues belonging to one group in the queue group information is collectively changed to a same configuration.

3. The computer system according to claim 2, wherein
the computer is a virtual computer running on a physical computer,
the memory and the plurality of CPU cores are, respectively, a virtual memory and a virtual CPU core included in the virtual computer,
the physical computer and the storage sub device are coupled by a Non-Volatile Memory Express (NVMe)-compliant interface,
the storage sub device is configured to determine whether to accept or refuse access by the I/O command enqueued to each of the plurality of queues to a logical storage unit based on the access controller, and
a queue management mechanism executed by the physical computer or a prescribed management computer manages the queue group information.

4. The computer system according to claim 3, wherein
the virtual computer is configured to transmit a queue assignment request command including a number of requested queues that is determined based on a number of virtual CPU cores to the queue management mechanism, and
the queue management mechanism is configured to determine a number of queues to be assigned to the virtual computer based on the number of requested queues included in the queue assignment request command received from the virtual computer, and transmit to the storage sub device a queue group creation command for creating a group to which the determined number of queues belongs.

5. The computer system according to claim 4, wherein
the queue management mechanism is configured to transmit to the storage sub device an access configuration command for collectively changing whether to accept or refuse access related to the plurality of queues belonging to one group in the queue group information to a same configuration.

6. The computer system according to claim 4, wherein
the queue management mechanism is configured to display a number of I/O commands, for which access refusal is determined, among I/O commands enqueued to a queue of the plurality of queues belonging to a certain group in association with a virtual computer in which the queue belonging to the queue group is configured.

7. The computer system according to claim 2, wherein
the computer is a virtual computer running on a physical computer,
the memory and the plurality of CPU cores are, respectively, a virtual memory and a virtual CPU core included in the virtual computer,
the computer system further comprises an adapter apparatus for coupling the physical computer to the storage sub device,
the physical computer and the adapter apparatus are coupled by a Non-Volatile Memory Express (NVMe)-compliant interface,
the adapter apparatus is configured to determine whether to accept or refuse access by the I/O command enqueued to each of the plurality of queues to a logical storage unit based on the access controller, and
a queue management mechanism executed by the adapter apparatus manages the queue group information.

8. The computer system according to claim 7, wherein
the adapter apparatus is configured not to transmit the I/O command to the storage sub device when a determination result of whether to accept or refuse access is access refusal.

9. The computer system according to claim 2, wherein
the access controller includes access control information that is a bitmap constituted by a plurality of queue IDs and a plurality of logical storage unit IDs, and a bit specified by one queue ID and one logical storage unit ID indicates whether to accept or refuse access from the specified queue ID to the specified logical storage unit ID.

10. The computer system according to claim 9, wherein
the queue group information is a bitmap constituted by a plurality of group IDs and a plurality of queue IDs, and a bit string specified by one group ID indicates a queue ID belonging to the group ID.

11. The computer system according to claim 10, wherein
collectively changing whether to accept or refuse access from the plurality of queues IDs belonging to a group ID to each logical storage unit ID to a same configuration refers to acquiring a bit string of a queue ID corresponding to the group ID that is a configuration change target from the queue group information and collectively replacing bit strings in the access control information by using the acquired bit string of the queue ID, the logical storage unit ID that is the configuration change target, and a bit after the configuration change.

12. An access control method, wherein
in at least one computer including a memory and a plurality of CPU cores, a plurality of queues are configured in the memory, and each of the plurality of queues is assigned at least one of the plurality of CPU cores,
the method comprising, when an I/O command dispatched from a CPU core assigned to a queue to a logical storage unit is enqueued to the queue, determining whether to accept or refuse access by the I/O command to each logical storage unit is determined based on an access controller that determines whether to accept or refuse access from each queue to each logical storage unit.

* * * * *